United States Patent
Wada et al.

(10) Patent No.: US 9,509,706 B2
(45) Date of Patent: Nov. 29, 2016

(54) SERVICE PERFORMANCE MONITORING METHOD

(75) Inventors: Kiyomi Wada, Tokyo (JP); Mineyoshi Masuda, Tokyo (JP); Kentaro Watanabe, Tokyo (JP)

(73) Assignee: HITACHI, LTD., Tokyo (JP)

( * ) Notice: Subject to any disclaimer, the term of this patent is extended or adjusted under 35 U.S.C. 154(b) by 135 days.

(21) Appl. No.: 14/400,499

(22) PCT Filed: Aug. 31, 2012

(86) PCT No.: PCT/JP2012/072097
§ 371 (c)(1),
(2), (4) Date: Nov. 11, 2014

(87) PCT Pub. No.: WO2014/033894
PCT Pub. Date: Mar. 6, 2014

(65) Prior Publication Data
US 2015/0135312 A1    May 14, 2015

(51) Int. Cl.
  G06F 11/00    (2006.01)
  G06F 12/14    (2006.01)
  G08B 23/00    (2006.01)
  H04L 29/06    (2006.01)
  G06F 11/34    (2006.01)
  G06F 11/07    (2006.01)

(52) U.S. Cl.
CPC ....... *H04L 63/1408* (2013.01); *G06F 11/3409* (2013.01); *G06F 11/3495* (2013.01); *G06F 11/00* (2013.01); *G06F 11/07* (2013.01); *G06F 11/0748* (2013.01); *G06F 2201/81* (2013.01); *G06F 2201/875* (2013.01); *H04L 63/1425* (2013.01)

(58) Field of Classification Search
CPC ........... H04L 63/1408; H04L 63/1425; G06F 11/00; G06F 11/07; G06F 11/0748

USPC ......................................................... 726/22
See application file for complete search history.

(56) References Cited

U.S. PATENT DOCUMENTS

| | | | |
|---|---|---|---|
| 6,885,907 B1* | 4/2005 | Zhang | G05B 23/024 164/151.5 |
| 7,272,646 B2* | 9/2007 | Cooper | H04L 12/2602 709/223 |
| 7,760,861 B1* | 7/2010 | Croak | H04M 15/00 379/114.14 |
| 9,037,922 B1* | 5/2015 | Cabrera | G06F 11/07 714/47.1 |
| 2004/0042470 A1* | 3/2004 | Cooper | H04L 12/2602 370/401 |
| 2005/0050378 A1* | 3/2005 | Liang | G06F 21/56 714/4.11 |

(Continued)

FOREIGN PATENT DOCUMENTS

| | | |
|---|---|---|
| JP | 2001-142746 A | 5/2001 |
| JP | 2001142746 A * | 5/2001 |

(Continued)

*Primary Examiner* — Jayesh Jhaveri
(74) *Attorney, Agent, or Firm* — Vople and Koenig, P.C.

(57) ABSTRACT

A monitoring system for monitoring a service execution infrastructure for providing a service to client computers via a network manages baselines of monitoring values of components per load of the service provided by the infrastructure, and uses the baselines depending on a current service load. When detecting an abnormality of a service monitoring value or component monitoring value by use of the baselines, the monitoring system compares events up to predetermined minutes ago from now with events in the baseline time zone thereby to specify a differential event (or non-normal recent event).

15 Claims, 24 Drawing Sheets

(56) References Cited

U.S. PATENT DOCUMENTS

2008/0208527 A1* 8/2008 Kavaklioglu ........ C10G 11/187
                                                                                   702/179
2011/0029817 A1* 2/2011 Nakagawa .......... G06F 11/0709
                                                                                    714/37

FOREIGN PATENT DOCUMENTS

| JP | 2005-316808 A | | 11/2005 |
| JP | 2005316808 A | * | 11/2005 |
| JP | 2011-034208 A | | 2/2011 |
| JP | 2011034208 A | * | 2/2011 |

* cited by examiner

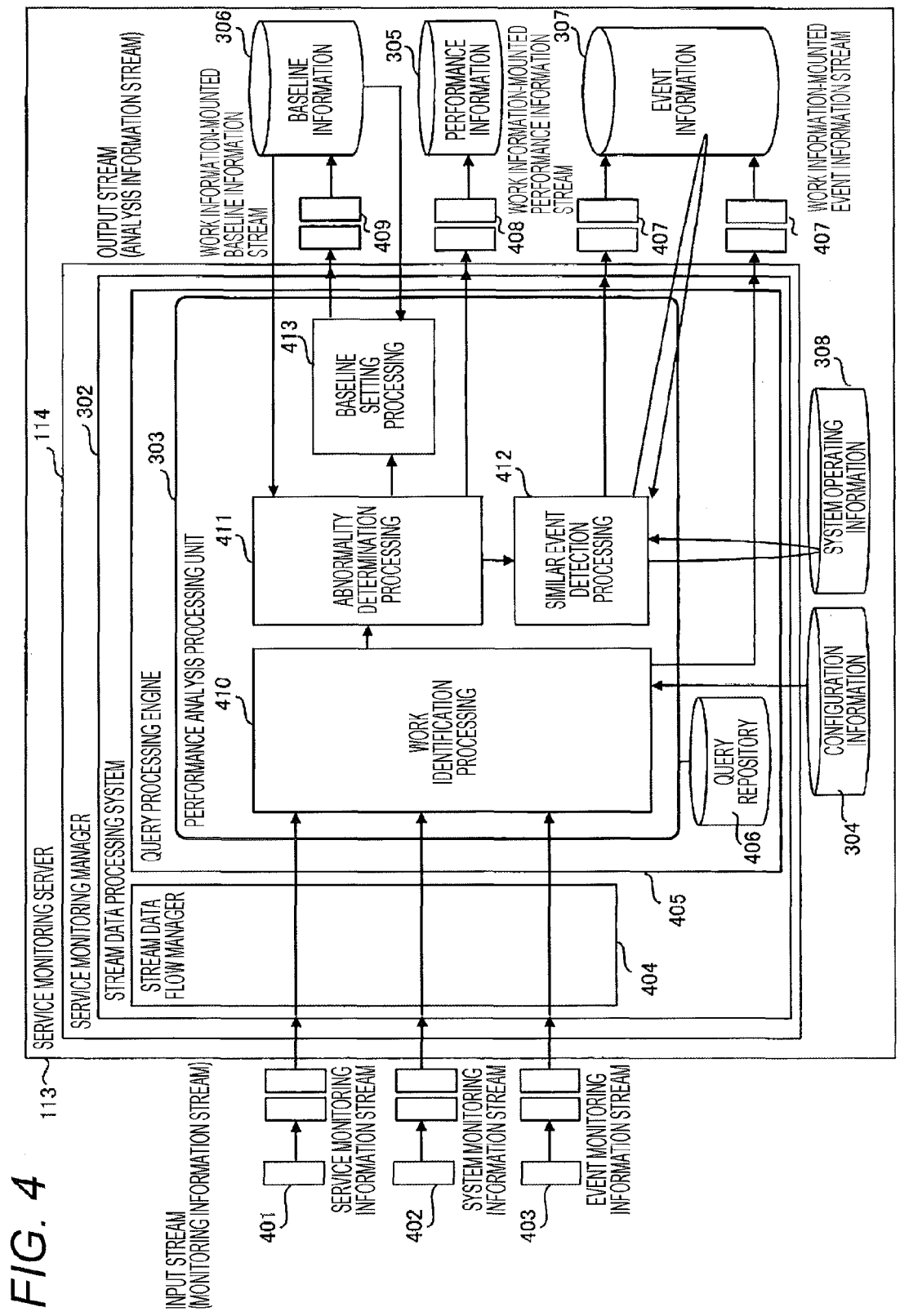

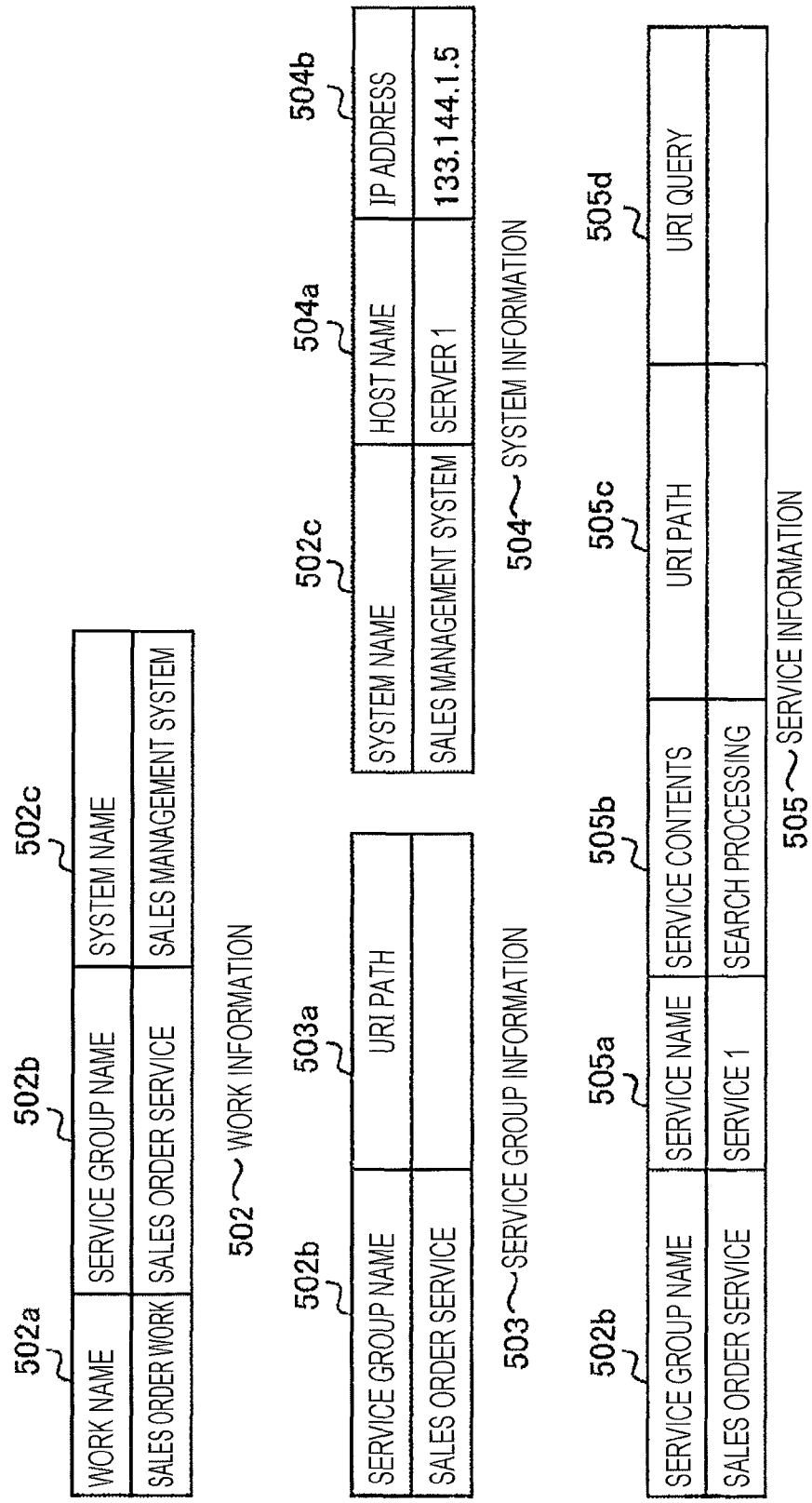

FIG. 9

407 ~ WORK INFORMATION-MOUNTED EVENT INFORMATION STREAM

| TIME | WORK NAME (801) | SERVICE GROUP NAME (502a) | SERVICE INFORMATION (505) | SYSTEM NAME (502c) | HOST INFORMATION (702) | EVENT INFORMATION (802) |
|---|---|---|---|---|---|---|

307a ~ EVENT INFORMATION TABLE

| TIME | WORK NAME | SERVICE GROUP NAME | SERVICE INFORMATION | | SYSTEM NAME | HOST INFORMATION | | EVENT INFORMATION |
| | | | SERVICE NAME (505a) | PROCESSING CONTENTS (505b) | (502c) | HOST NAME (702a) | IP ADDRESS (702b) | (802) |
|---|---|---|---|---|---|---|---|---|
| '12/07/31 15:21 | SALES ORDER WORK | SALES ORDER SERVICE | SERVICE 1 | SEARCH PROCESSING | SALES MANAGEMENT SYSTEM | SERVER 1 | 133.144.1.5 | |

307b ~ DIFFERENTIAL EVENT INFORMATION TABLE

| TIME | WORK NAME | SERVICE GROUP NAME | SERVICE INFORMATION | | SYSTEM NAME | HOST INFORMATION | | EVENT INFORMATION |
| | | | SERVICE NAME | PROCESSING CONTENTS | | HOST NAME | IP ADDRESS | |
|---|---|---|---|---|---|---|---|---|
| '12/07/31 15:21 | SALES ORDER WORK | SALES ORDER SERVICE | SERVICE 1 | SEARCH PROCESSING | SALES MANAGEMENT SYSTEM | SERVER 1 | 133.144.1.5 | |

307c ~ SIMILAR EVENT INFORMATION TABLE

| TIME | WORK NAME | SERVICE GROUP NAME | SERVICE INFORMATION | | SYSTEM NAME | HOST INFORMATION | | EVENT INFORMATION |
| | | | SERVICE NAME | PROCESSING CONTENTS | | HOST NAME | IP ADDRESS | |
|---|---|---|---|---|---|---|---|---|
| '12/07/31 15:21 | SALES ORDER WORK | SALES ORDER SERVICE | SERVICE 1 | SEARCH PROCESSING | SALES MANAGEMENT SYSTEM | SERVER 1 | 133.144.1.5 | |

FIG. 10

408a — WORK INFORMATION-MOUNTED SERVICE PERFORMANCE INFORMATION STREAM

| TIME | WORK NAME | SERVICE GROUP NAME | SERVICE INFORMATION | DETERMINATION | RESPONSE TIME/ MINUTE (STATISTIC VALUE) | THROUGHPUT/ MINUTE (CUMULATIVE VALUE) | ERROR RATE/ MINUTE (CUMULATIVE VALUE) |
|---|---|---|---|---|---|---|---|
| 1001 | 502a | 502b | 505 | | 1002 | 1003 | 1004 | 1005 |

305a — SERVICE PERFORMANCE INFORMATION TABLE

| TIME | WORK NAME | SERVICE GROUP NAME | SERVICE INFORMATION | | DETERMINATION | RESPONSE TIME/MINUTE (STATISTIC VALUE) | | | | THROUGHPUT/MINUTE (CUMULATIVE VALUE) | ERROR RATE/MINUTE (CUMULATIVE VALUE) |
|---|---|---|---|---|---|---|---|---|---|---|---|
| | | | SERVICE NAME | CONTENTS | | AVERAGE | MINIMUM | MAXIMUM | DISPERSION | | |
| '12/07/31 15:20 | SALES ORDER WORK | SALES ORDER SERVICE | SERVICE 1 | SEARCH PROCESSING | NORMAL | 3.0 | 1.0 | 5.0 | σ | 100 | 0 |
| | | | SERVICE 2 | REGISTRATION PROCESSING | NORMAL | 5.0 | 3.0 | 8.0 | σ | 10 | 0 |
| '12/07/31 15:21 | | | | | | | | | | | |

FIG. 12

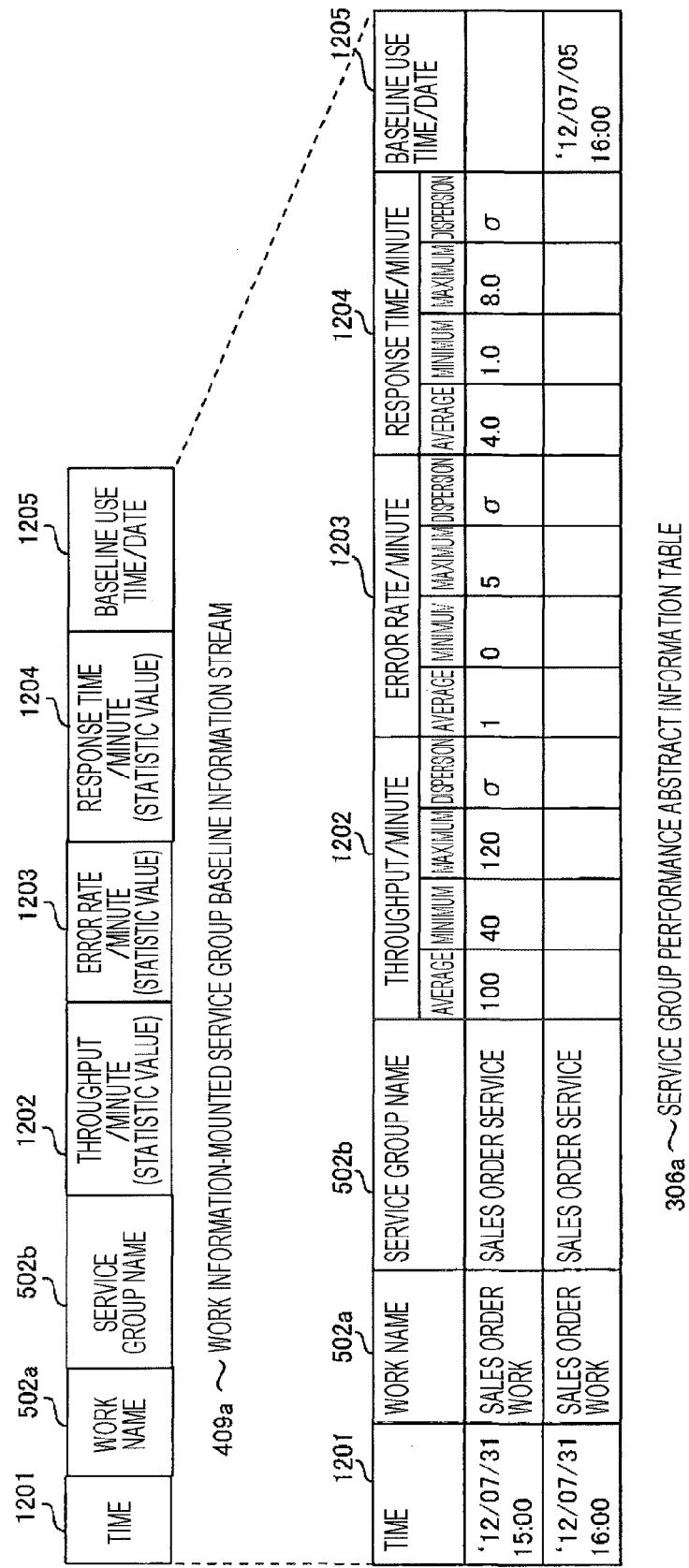

409a — WORK INFORMATION-MOUNTED SERVICE GROUP BASELINE INFORMATION STREAM

| TIME | WORK NAME | SERVICE GROUP NAME | THROUGHPUT /MINUTE (STATISTIC VALUE) | ERROR RATE /MINUTE (STATISTIC VALUE) | RESPONSE TIME /MINUTE (STATISTIC VALUE) | BASELINE USE TIME/DATE |
|---|---|---|---|---|---|---|
| 1201 | 502a | 502b | 1202 | 1203 | 1204 | 1205 |

306a — SERVICE GROUP PERFORMANCE ABSTRACT INFORMATION TABLE

| TIME | WORK NAME | SERVICE GROUP NAME | THROUGHPUT/MINUTE | | | | ERROR RATE/MINUTE | | | | RESPONSE TIME/MINUTE | | | | BASELINE USE TIME/DATE |
|---|---|---|---|---|---|---|---|---|---|---|---|---|---|---|---|
| | | | AVERAGE | MINIMUM | MAXIMUM | DISPERSION | AVERAGE | MINIMUM | MAXIMUM | DISPERSION | AVERAGE | MINIMUM | MAXIMUM | DISPERSION | |
| '12/07/31 15:00 | SALES ORDER WORK | SALES ORDER SERVICE | 100 | 40 | 120 | σ | 1 | 0 | 5 | σ | 4.0 | 1.0 | 8.0 | σ | |
| '12/07/31 16:00 | SALES ORDER WORK | SALES ORDER SERVICE | | | | | | | | | | | | | '12/07/05 16:00 |

FIG. 14

1401 — SERVICE CATALOG TABLE

| | 1403 | 1404 | 1405 | 1406 | 1407 |
|---|---|---|---|---|---|
| SYSTEM TYPE | SERVER SPECIFICATION | OS TYPE | MIDDLEWARE TYPE | QUANTITY |
| X1 SYSTEM | Standard | Win2008 | IIS | 1 |
| | Standard | Win2008 | MSSQL | 1 |
| X2 SYSTEM | Standard | Win2008 | IIS | 2 |
| | Premium | Win2008 | MSSQL | 1 |
| Y SYSTEM | Standard | Win2008 | Apache/Tomcat | 1 |
| | Premium | Win2008 | Oracle | 1 |
| Z SYSTEM | Standard | Win2008 | uCosmi | 1 |
| | Premium | Win2008 | HiRDB | 1 |

1402 — SYSTEM OPERATING INFORMATION TABLE

502c / 1403 / 1408 / 1409 / 1410 / 1411 / 1412 / 1413

| SYSTEM NAME | SYSTEM TYPE | UP INFORMATION | CUMULATIVE OPERATING DAYS | NUMBER OF ALERTS | NUMBER OF FAILURES | AVERAGE SERVICE PERFORMANCE INFORMATION PER PREDETERMINED TIME | AVERAGE SYSTEM PERFORMANCE INFORMATION PER PREDETERMINED TIME |
|---|---|---|---|---|---|---|---|
| OLD A SYSTEM | X1 SYSTEM | a1 APPLICATION a2 APPLICATION | 480 DAYS | 800 TIMES | 50 TIMES | 100 ITEMS/MINUTE | CPU USE RATE···40% MEMORY USE RATE···60% Disk IO USER RATE···40% |
| NEW A SYSTEM | X2 SYSTEM | a1 APPLICATION | 200 DAYS | 360 TIMES | 40 TIMES | 500 ITEMS/MINUTE | |
| B SYSTEM | Y SYSTEM | b APPLICATION | 180 DAYS | 250 TIMES | 20 TIMES | 1000 ITEMS/MINUTE | |
| C SYSTEM | Y SYSTEM | c APPLICATION | 100 DAYS | 180 TIMES | 18 TIMES | 1200 ITEMS/MINUTE | |

FIG. 21

2101 — INPUT INFORMATION FOR INCIDENT SEARCH

| START TIME/DATE (2105) | END TIME/DATE (2106) | WORK NAME (502a) | SERVICE GROUP NAME (502b) | SYSTEM NAME (502c) | DIFFERENTIAL EVENT ID (EVENTS ARE SEGMENTED WITH ;) (2107) |
|---|---|---|---|---|---|
| | | SALES ORDER WORK | | | |

2102 — INCIDENT INFORMATION TABLE

| TITLE (2108) | SEVERITY (2109) | INCIDENT ID (2110) | URL TO INCIDENT ID (2111) | WORK NAME (502a) | SERVICE GROUP NAME (502b) | SYSTEM NAME (502c) | OCCURRENCE TIME/DATE (2112) | RELATED EVENT ID (EVENTS ARE SEGMENTED WITH ;) (2113) |
|---|---|---|---|---|---|---|---|---|
| | | INCIDENT 1 | | SALES ORDER WORK | | | | |

2103 — OUTPUT INFORMATION OF INCIDENT SEARCH RESULT

| TITLE (2108) | SEVERITY (2109) | INCIDENT ID (2110) | URL TO INCIDENT ID (2111) | WORK NAME (502a) | SERVICE GROUP NAME (502b) | SYSTEM NAME (502c) | OCCURRENCE TIME/DATE (2112) | RELATED EVENT ID (EVENTS ARE SEGMENTED WITH ;) (2113) |
|---|---|---|---|---|---|---|---|---|
| | | INCIDENT 1 | | SALES ORDER WORK | | | | |

2104 — SIMILAR INCIDENT INFORMATION TABLE

| WORK NAME (502a) | SEVERITY (2109) | INCIDENT ID (2110) | URL TO INCIDENT ID (2111) | OCCURRENCE TIME/DATE (2112) | TITLE (2118) | RELATED EVENT ID (EVENTS ARE SEGMENTED WITH ;) (2113) |
|---|---|---|---|---|---|---|
| SALES ORDER WORK | | | | | | |

SERVICE PERFORMANCE MONITORING METHOD

TECHNICAL FIELD

Embodiments relate to a technique for monitoring an information system.

BACKGROUND ART

Conventionally, for system monitoring, thresholds are set for a server to be monitored and monitoring items capable of being monitored by the server and the thresholds are monitored for the monitoring items, respectively, thereby detecting an abnormality. However, a proper threshold for each monitoring item is difficult to set and a setting work load is heavy, and thus PTL 1 discloses a technique "comprising a load model data creating means 14 for creating load model data indicating a temporal transition of system loads based on past load information of a computer system 1, a threshold data creating means 16 for adding designated threshold correction data to the load model data and time-sequentially calculating threshold data, and an abnormal load detecting means 17 for detecting an abnormal load of the system by comparing current load information of the system 1 with threshold data at a corresponding time thereto.

CITATION LIST

Patent Literature

PTL 1: Publication of Patent No. 2001-142746

SUMMARY OF INVENTION

Technical Problem

With the technique disclosed in PTL 1, it is difficult to monitor a system for providing a service to a client computer via a network. The difficulty is the following (1) or (2), for example.

(1) When components in a system (service execution infrastructure) for providing a network service are monitored, monitoring values can change depending on request contents from a terminal (such as request type or the number of requests per unit time), but the past monitoring values are not managed as baselines in consideration of the request contents in PTL 1, and thus many errors in abnormality detection occur.

(2) When an abnormality is detected in the service execution infrastructure, an event occurring in the system cannot be rapidly analyzed.

Solution to Problem

In order to solve the above problems, particularly (1), a monitoring system for monitoring a service execution infrastructure manages baselines of monitoring values of components per load of a service provided by the infrastructure, and uses the baselines depending on a current service load. In order to solve (2), when detecting an abnormality of a service monitoring value or component monitoring value with a baseline, the monitoring system compares events up to predetermined minutes ago from now with events in a baseline time zone thereby to specify a differential event (or non-normal latest event).

Advantageous Effects of Invention

According to the present invention, it is possible to effectively monitor a service execution infrastructure for providing a network service.

BRIEF DESCRIPTION OF DRAWINGS

FIG. 4 is a diagram illustrating a performance analysis processing flow of a service monitoring manager using a stream data processing system according to the first embodiment.

FIG. 5A illustrates exemplary configuration information according to the first embodiment.

FIG. 9 is a diagram illustrating an event information table, a differential event information table and a similar event information table as storage destinations of the work information-mounted event information stream according to the first embodiment.

FIG. 10 is a diagram illustrating a service performance information table as a storage destination of a work information-mounted service performance information stream according to the first embodiment.

FIG. 12 is a diagram illustrating a service group performance abstract information table as a storage destination of a work information-mounted service group baseline information stream according to the first embodiment.

FIG. 14 is a diagram illustrating a service catalog table and a system operating information table based on the service catalog according to the first embodiment.

FIG. 21 is a diagram illustrating information for handling an incident according to the second embodiment.

DESCRIPTION OF EMBODIMENTS

The contents of embodiments will be described below. The following terms will be used in the following description, and the meanings thereof are substantially as follows.

Stream: a flow of information indicating a temporal transition of over-time changeable information such as event or measurement value.

Baseline: a statistically-processed past monitoring value or monitoring value on which abnormality determination is based.

Information on the present invention will be described by use of the expressions such as "aaa table", "aaa list", "aaa DB" and "aaa queue" in the following description, but the information may be expressed by other than the data structure such as table, list, DB and queue. Thus, "aaa table", "aaa list", "aaa DB", "aaa queue", and the like may be called "aaa information" in order to indicate non-dependence on the data structure.

Further, the expressions such as "identification information", "identifier", "name" and "ID" are used for describing the contents on each item of information, but they are replaceable with each other.

The description may be made below by use of a subject of "program", but the program is executed by a processor thereby to perform predefined processings by use of a memory and a communication port (communication control device), and thus the description may be made by use of a subject of processor. The processings disclosed with a subject of program may be performed by a computer such as management server, or an information processing device. Part or all of the entire programs may be realized in dedicated hardware.

Various programs may be installed in each computer via a program distribution server or computer readable storage medium. In this case, the program distribution server includes a CPU and storage resources, and the storage resources store a distribution program and programs to be distributed therein. Then, the CPU executes the distribution program so that the CPU in the program distribution server distributes a program to be distributed to other computer.

First Embodiment

Figure 1:
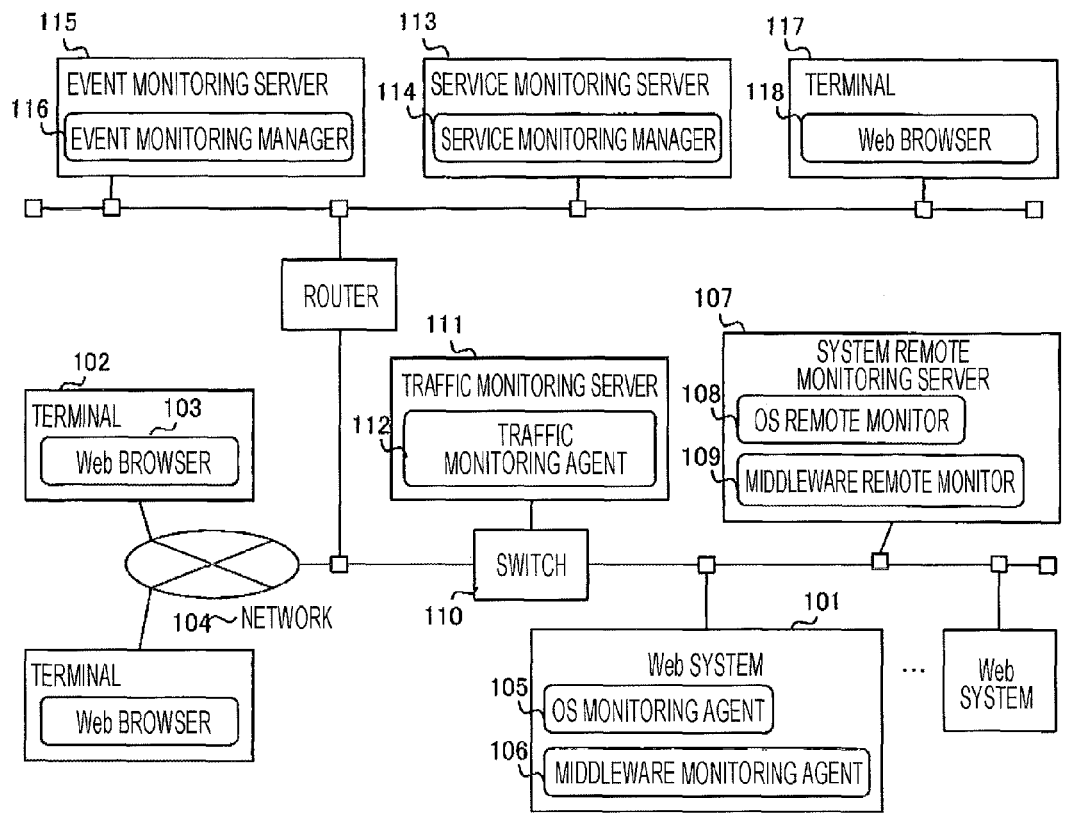
FIG. 1 is a diagram illustrating an information system according to a first embodiment.

FIG. 1 is a structure diagram of an information system including a monitoring system. A Web system 101 of a service execution infrastructure, and a service used by an end user from each terminal 102 via a network 104 by use of a Web browser 103 are to be monitored. The monitoring system monitors a plurality of Web systems and services available thereon. In the present embodiment, Web is illustrated as an exemplary service, but the services include other file sharing services and network services.

The Web system 101 is a service execution infrastructure configured of a server (configured of a processor, storage resources, a network and the like), OS, and a physical or logical component such as middleware. When the Web system 101 is monitored, for example, an OS monitoring agent 105 or middleware monitoring agent 106, which is resident in a server to be monitored and is directed for monitoring an operation performance of the OS or middleware, monitors the same. Alternatively, an OS remote monitor 108 or middleware remote monitor 109 in a system remote monitoring server 107 monitors an operation performance of the OS or middleware in the server configuring the system. The OS monitoring agent 105, the middleware monitoring agent 106, the OS remote monitor 108, and the middleware remote monitor 108 transmit the monitoring values for predetermined monitoring items of the components to be monitored to a service monitoring server 113, respectively.

With the service monitoring using Web access, transmission/reception packets of the Web system 101 are mirrored from a mirror port of a network switch 110, and are sent to a traffic monitoring server 111. A traffic monitoring agent 112 mounted on the traffic monitoring server 111 analyzes Http packets and calculates a response time. The traffic monitoring server 111 transmits the outline of the Http packets and the response time as monitoring results to the service monitoring server 113. Herein, a plurality of traffic monitoring servers 111 may be present, and may collect and analyze packets from connection destination switches, respectively. Not only the traffic monitoring server 111, any server having a function of collecting packets flowing on a network, analyzing Http packets, calculating a response time, and outputting the Http packet information and the response time may be provided. The service monitoring method may employ a method for adding a program capable of calculating a response time to a Web server of the service execution infrastructure, for example, other than the above method.

An event monitoring manager 116 in an event monitoring server 115 acquires all the event information notified from the Web system 101 to be monitored or various monitoring servers 107 and 111. Types of events occurring in the service execution infrastructure (or detected (received) by the event monitoring server) assume when a monitoring value of a component failure or alert, or a component performance exceeds a predetermined reference, when a processing starts in the service execution infrastructure (such as virus scanning, garbage collection, and defragmentation), and the like, and other exemplary cases are possible.

A service monitoring manager 114 mounted on the service monitoring server 113 compares a component monitoring value with a baseline thereby to make an abnormality determination, and notifies an abnormality notification to the event monitoring manager 116 in the event monitoring server 115. Further, it compares a response time and a baseline per service to be monitored based on the outline of the Http packets and the response time thereby to make an abnormality determination, and notifies an abnormality notification event to the event monitoring manager 116 in the event monitoring server 115.

Herein, when the component monitoring value or service performance is abnormal, events in a normal time zone employed for the baseline and an abnormal time zone are compared among the events on the service and its related system, thereby detecting a differential event or a combination of events appearing during abnormal time. Then, a search is made as to whether the differential event and similar event or a combination of events is contained in the past events.

Further, numerical values for standardizing a response time are calculated, and a baseline is set based on the monitoring results.

The service monitoring result can be remotely viewed by use of a Web browser 118 of a terminal 117. Of course, the terminal 117 displaying the service monitoring result thereon may be the same as or different from the terminal 102 provided with a service.

The monitoring system for monitoring the service execution infrastructure according to the present embodiment is configured of the three servers including the traffic monitoring server 111, the service monitoring server 113 and the event monitoring server 115, but the traffic monitoring and the service monitoring described later may be processed by at least one server. Further, the terminal 117 meeting the above spirit may be included in the monitoring system if its display or input is described in Claims. To the contrary, the terminal may not be included in the monitoring system if a server for performing a traffic monitoring or service monitoring processing, such as service monitoring server, performs display or input. Further, if the monitoring processing is distributed in a plurality of servers for higher reliability, parallelization or distribution of the monitoring processing, the servers for the processing are put together in the monitoring system.

The description will be made below by way of a component monitoring value as performance value, but may be applied to other monitoring values (such as the number of access retries to component, packet loss rate, the number of context switches, request queue length to component, and the number of times of queue overflow).

Figure 2:
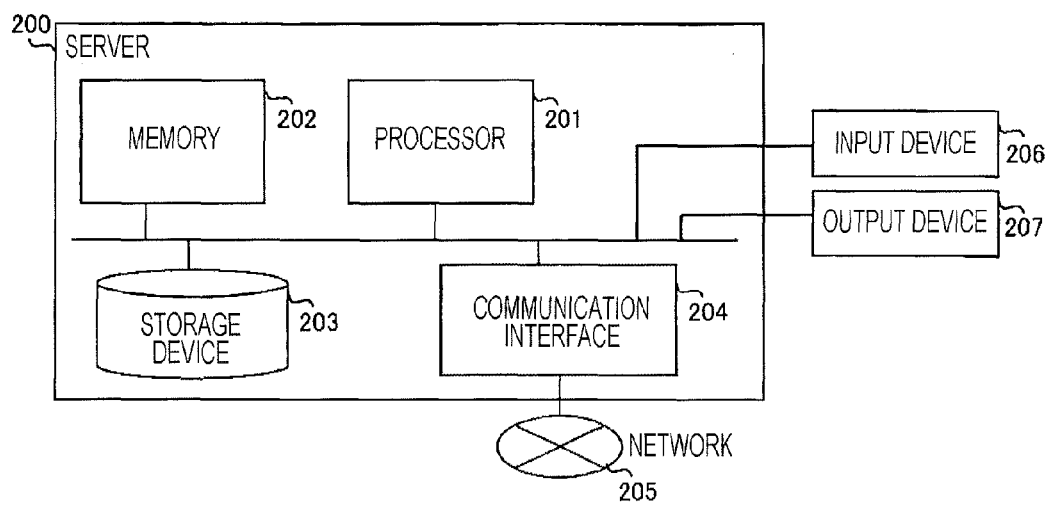
FIG. 2 is a diagram illustrating a hardware structure of a computer according to the first embodiment.

FIG. 2 illustrates a hardware structure of a computer other than the terminal 102, the servers included in the Web system 101, the traffic monitoring server 111, the system remote monitoring server 107, the event monitoring server 115 and the terminal 117 according to the embodiment. As illustrated in FIG. 2, the computer includes a processor 201, a memory 202, a storage device 203, and a communication interface 204, which are communicated with each other. The computer may include an input device 206 and an output device 207 as needed. The servers and terminals are illustrated together in FIG. 2, but the computer does not necessarily have the same hardware. The programs indicated in corner-rounded squares in the respective computers in FIG. 1 are stored in the memory 202 or the storage device 203 (which will be collectively called storage resources below) and are executed by the processor 201.

Figure 3:
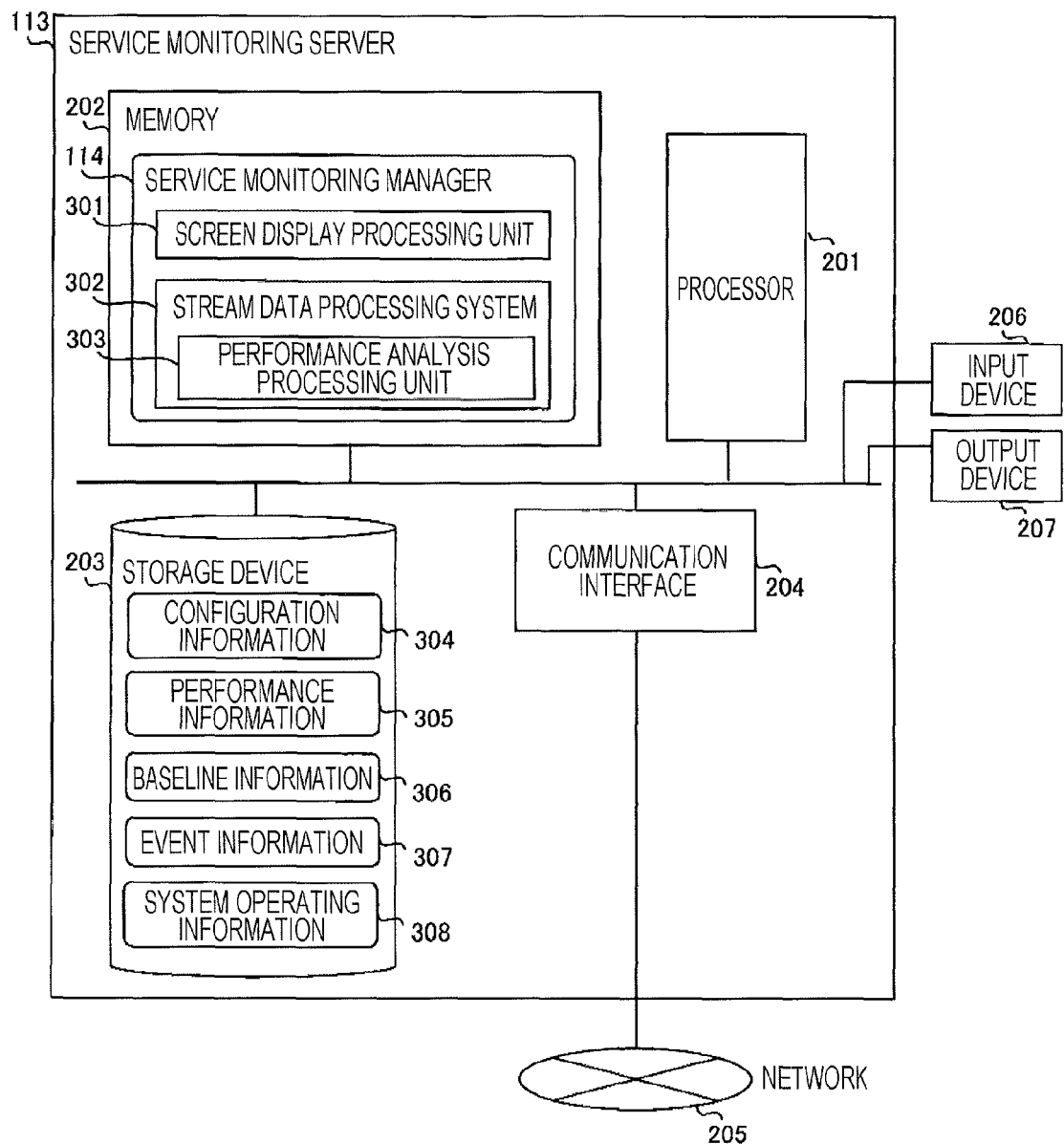
FIG. 3 is a diagram illustrating a structure of a service monitoring server according to the first embodiment.

FIG. 3 is a diagram illustrating the information and programs stored in the storage resources in the computer illustrated in FIG. 2. In the Figure, the service monitoring manager program 114 (which will be simply called service monitoring manager below) is stored in the memory 202, and other items of information are stored in the storage device 203, but each program and item of information may be stored in any of the storage resources. The service monitoring manager 114 includes a screen display processing unit 301 and a performance analysis processing unit 303. The storage device 203 stores therein configuration information 304, performance information 305, baseline information 306, event information 307 and system operating information 308. I/O information exchanged with the terminal 117 via the Web browser 118, component monitoring value information received from the Web system 101 or the system remote monitoring server 107, Http packet information received from the traffic monitoring server 111, and event information received from the event monitoring server 115 are input and output via the communication interface 204. An input device and an output device are illustrated as separate devices in FIG. 2 and FIG. 3, but they may be assumed to be used as a server or terminal by a computer such as Smartphone or tablet computer, and thus one device may serve as both an input device and an output device.

FIG. 4 illustrates an exemplary structure and exemplary processing flow of the service monitoring manager 114 inside the service monitoring server 113. The service monitoring manager 114 has the performance analysis processing unit 303 using a stream data processing system 302. A query repository 406 stores therein execution codes of processing contents of the performance analysis processing unit 303. The technique disclosed in Japanese Patent Application Laid-Open No. 2006-338432 publication may be employed for a method for receiving stream data inside the stream data processing system and a method for analyzing a received query or registering an optimized or generated query execution form. The present invention may not necessarily be accomplished as in Japanese Patent Application Laid-Open No. 2006-338432 Publication, and other accomplishing systems capable of updating or creating the baseline information 306, the performance information 305 and the event information 307 from input streams described below may be employed.

The stream data processing system 302 receives a service monitoring information stream 401 from the traffic monitoring server 111, a system monitoring information stream 402 from the Web system 101 or the system remote monitoring server 107, and an event monitoring information stream 403 from the event monitoring server 105. The input streams (monitoring information streams) 401 to 403 are subjected to a performance analysis processing by use of a query processing engine 405 via a stream data flow manager 404. The performance analysis processing unit 303 is performed in the order of a work identification processing 410, an abnormality determination processing 411, a similar event detection processing 412, and then a baseline setting processing 413.

In the work identification processing 410, work information-mounted monitoring information streams are generated in which work information made of service and system of the configuration information 304 is added to the input streams (monitoring information streams) 401 to 403, respectively. A work information-mounted event information stream 407 is stored in the event information 307.

In the abnormality determination processing 411, the performance values of the work information-mounted service performance streams within a predetermined time (one minute, for example) are subjected to a statistic processing (of calculating an average value, a maximum value, a minimum value and a dispersion value) per service, and their statistic values are compared with service performance abstract information on a baseline use time/date per work-based service group of the baseline information 306 to determine whether they are within a baseline permitted range, and a service performance information stream 408 including a determination result is stored in the performance information 305. The performance value of the work information-mounted system monitoring information stream is compared with server performance abstract information of an agent-based monitoring item of each host on a baseline use time/date per work-based system of the baseline information 306 to determine whether it is within a baseline permitted range, and the system performance information stream 408 including a determination result is stored in the performance information 305. Herein, when the service performance and the system performance are determined as abnormal, it is notified to the event monitoring server 115.

When the service performance or the system operating performance exceeds a baseline permitted range, the similar event detection processing 412 extracts and compares an event in an abnormal time zone and an event in a normal time zone used for a baseline for the work from the event information 307, and detects a differential event appearing only during abnormal time. A search is made as to whether an event similar to the differential event is present in the past events for the work in the event information 307. When a similar event is not present in the work, a system similar to the system configuration of the work is detected from the system operating information 308, and event information on the work for the similar system among the event information 307 is also to be searched. As a result of the processing, the differential event information 407 and the similar event information 407 are stored in the event information 308.

In the baseline setting processing 413, the performance values of the work information-mounted service performance streams within a predetermined time (one hour, for example) are subjected to a statistic processing (of calculating an average value, a maximum value, a minimum value and a dispersion value) per service group to be stored in the baseline information 306. The performance values of the work information-mounted system performance information streams within a predetermined time (one hour, for example) are subjected to a statistic processing (of calculating an average value, a maximum value, a minimum value and a dispersion value) per agent-based monitoring item of each host to be stored in the baseline information 306. A time/date when the average value of throughput/minute and the value of throughput/minute in the same time zone in past stored in the baseline information 306 are close to each other is detected per service group in units of predetermined time (one hour, for example), and a work-based baseline use time/date in a next time zone is stored as a next time zone on the detection date in the baseline information 306.

FIG. 5A is a schematic diagram illustrating the configuration information 304. The configuration information 304 stores therein information on components including work groups included in the Web system (such as component setting information or attribute information) or relationships between components (such as communication relationship or inclusion relationship). FIG. 5 illustrates that configuration information 502, service group information 503, system information 504, and service information 505 are included in the configuration information 304 by way of example.

The contents of the work information 502 are work name 502a, service group name 502b, and system name 502c. The contents of the service group information 503 are service group name 502b and URI path 503a. The contents of the service information 505 are service group name 502b, service name 505a, service contents 505b, URI path 505c, and URI query 505d. The contents of the system information 504 are system name 502c, host name 504a, and IP address 504b.

Figure 5B:
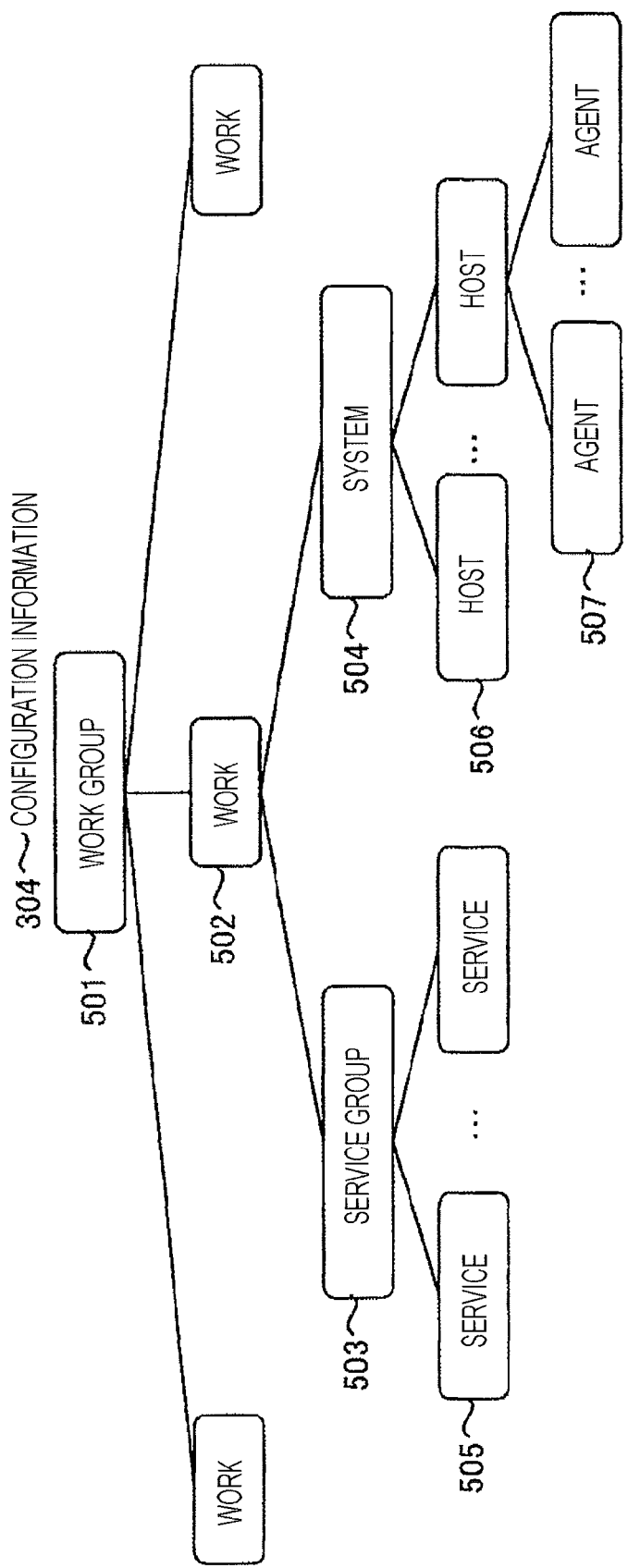
FIG. 5B illustrates an exemplary structure of a Web system as an exemplary system execution infrastructure according to the first embodiment.

FIG. 5B is a diagram illustrating an exemplary structure of the Web system. The work group 501 is made of a plurality of works 502. The work 502 is made of service group 503 and system 504. The service group 503 is made of a plurality of services 505. The system 504 is made of a plurality of hosts 506. The host 506 is made of a plurality of agents. If a plurality of works are not handled in one monitoring system and a Web system, a work group may not be present. Similarly, if a plurality of services are not provided, a service group may not be present.

Figure 6:
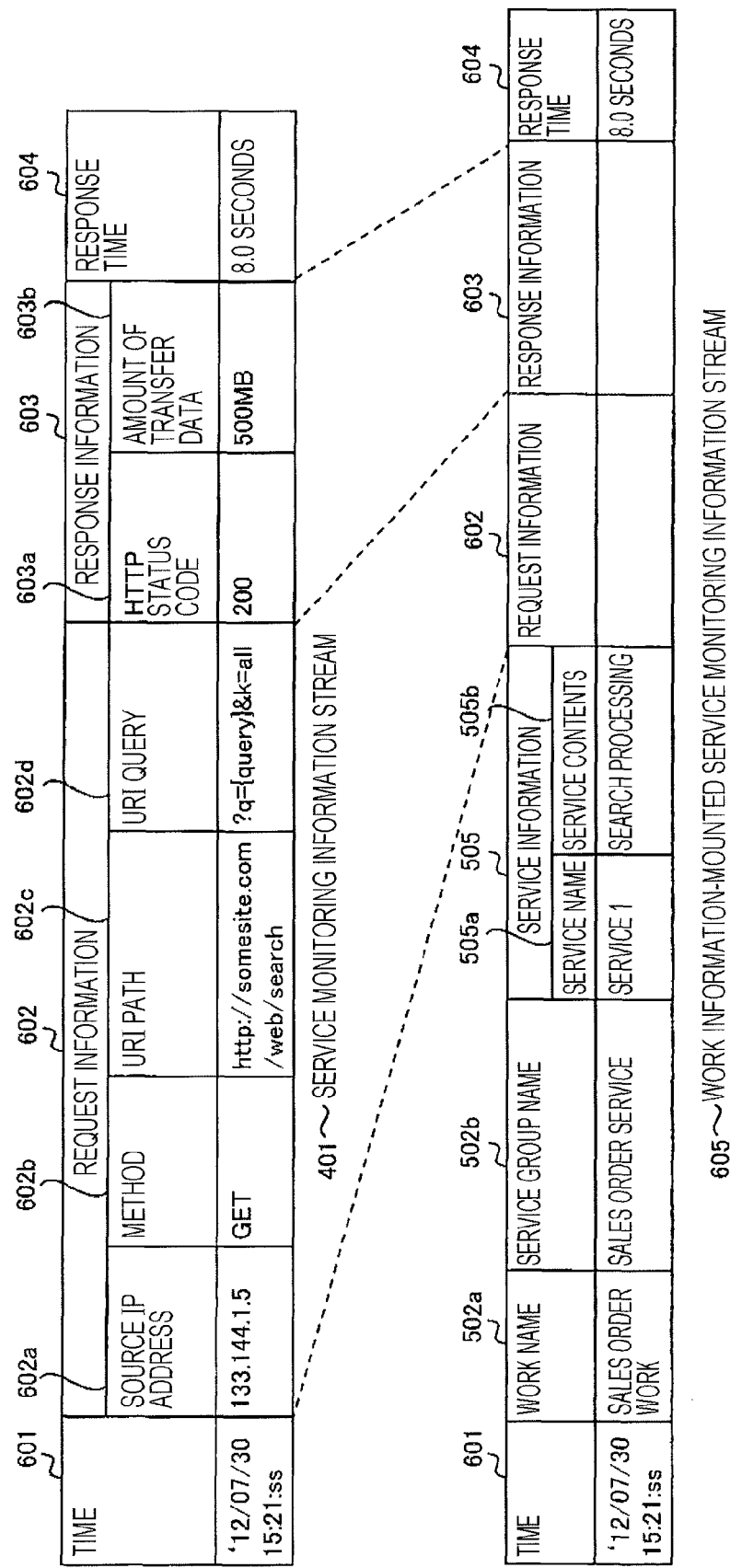
FIG. 6 is a diagram illustrating contents of a service monitoring information stream and a work information-mounted service monitoring information stream for a service of the system execution infrastructure according to the first embodiment.

FIG. 6 illustrates the service monitoring information stream 401 and a work information-mounted service monitoring information stream 605 as an output result of the work identification processing 410.

The service monitoring information stream 401 is made of time 601, request information 602, response information 603, and response time 604. The contents of the request information 602 are source IP address 602a, method 602b, URI path 602c, and URI query 602d. The contents of the response information 603 are HTTP status code 603a and transfer data amount 603b.

The work information-mounted service monitoring information stream is made of time 601, work name 502a, service group name 502b, service information 505, request information 602, response information 603, and response time 604. The contents of the service information 505 are service name 505a and service contents 505b.

Figure 7:
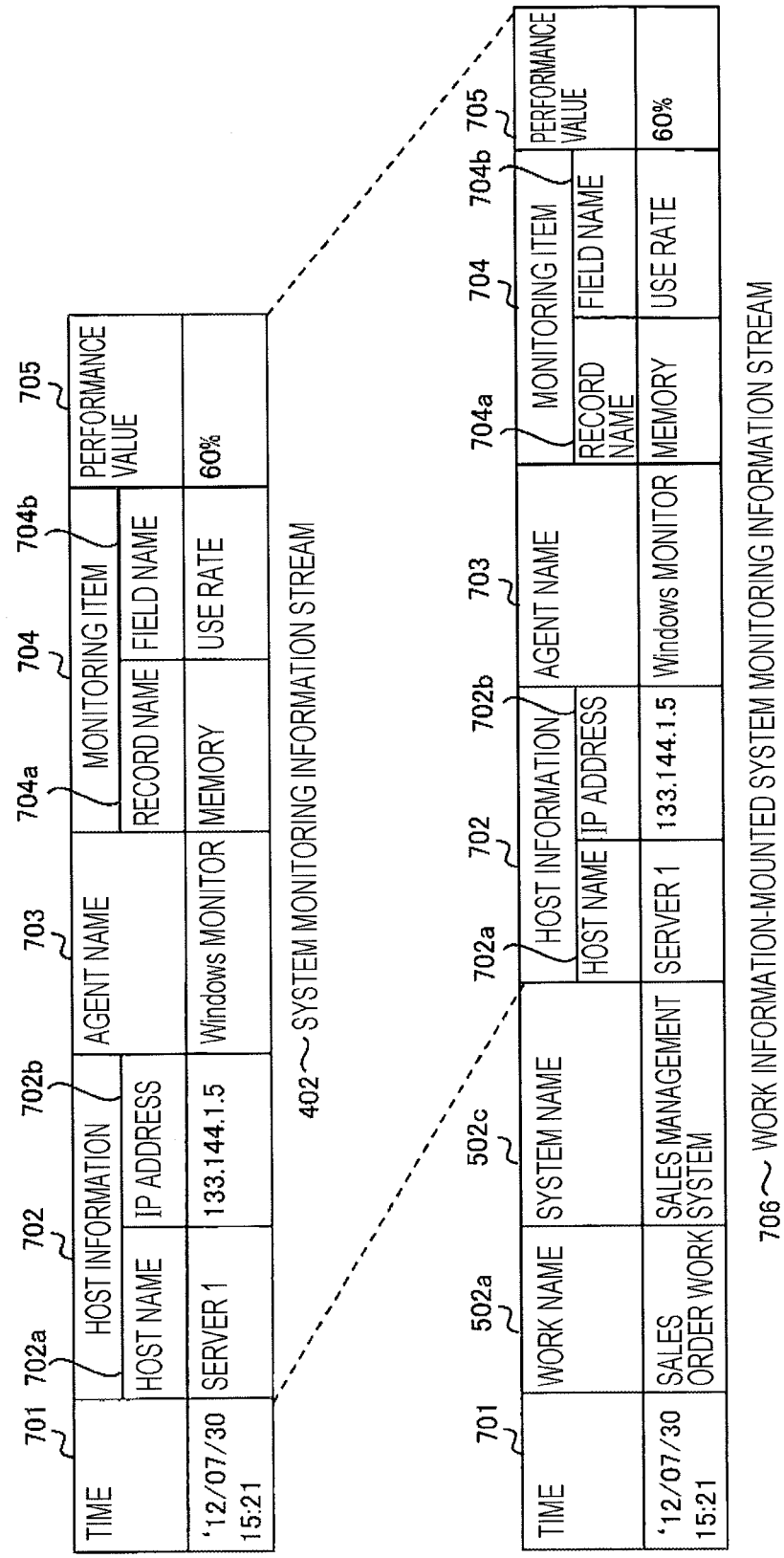
FIG. 7 is a diagram illustrating contents of a system monitoring information stream and a work information-mounted system monitoring information stream for a component of the system execution infrastructure according to the first embodiment.

FIG. 7 illustrates the system monitoring information stream 402, and a work information-mounted system monitoring information stream 706 as an output result of the work identification processing 410.

The system monitoring information stream 402 is made of time 701, host information 702, agent name 703, monitoring item 704, and performance value 705. The contents of the host information 702 are host name 702a and IP address 702b. The contents of the monitoring item 704 are record name 704a and field name 704b.

The work information-mounted system monitoring information stream 706 is made of time 701, work name 502a, system name 502c, host information 702, agent name 703, monitoring item 704, and performance value 705.

Figure 8:
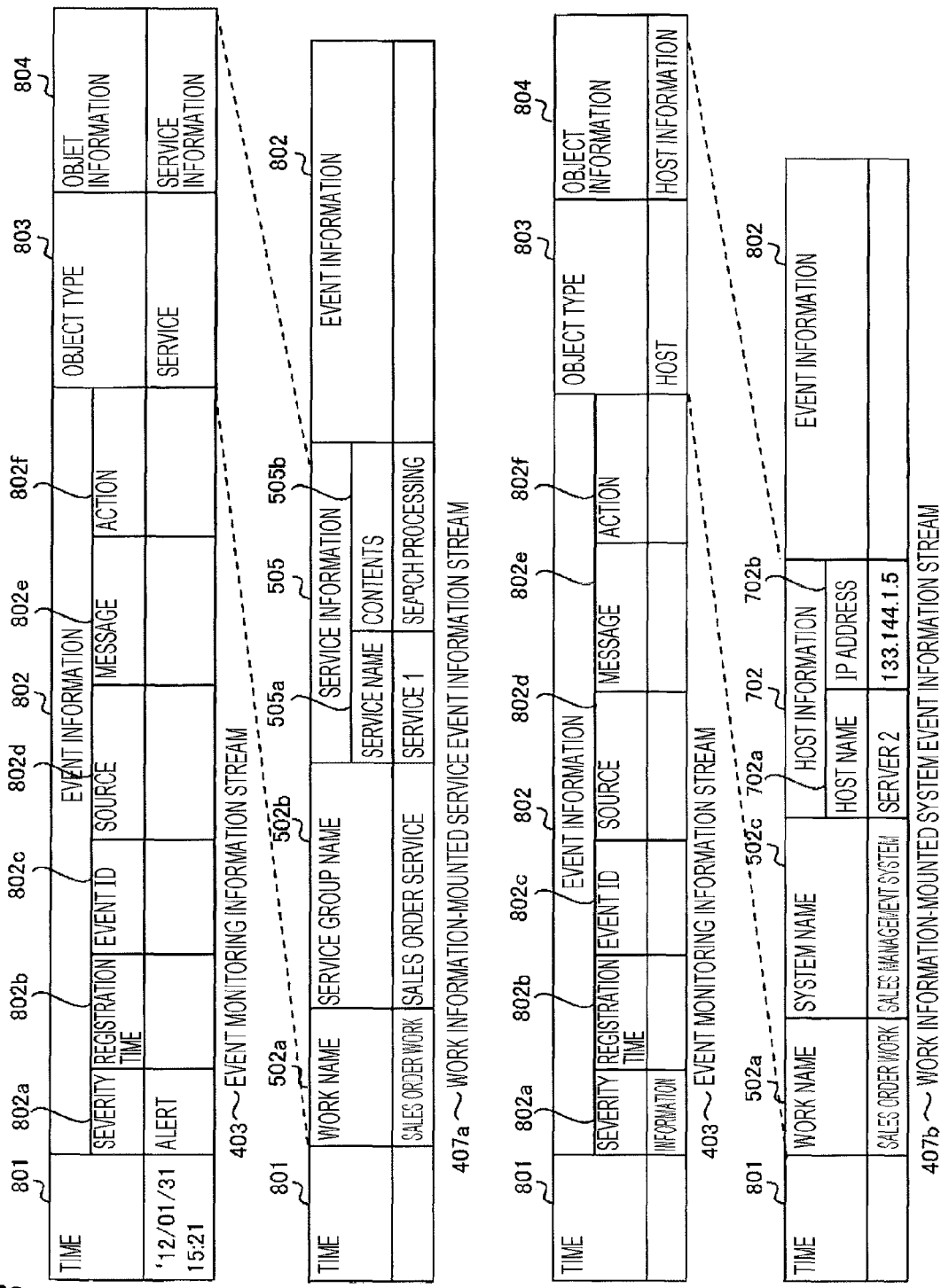
FIG. 8 is a diagram illustrating contents of an event monitoring information stream and a work information-mounted event information stream for the system execution infrastructure according to the first embodiment.

FIG. 8 illustrates the event monitoring information stream 403 as well as a work information-mounted service event information stream 407a and a work information-mounted system event information stream 407b as output results of the work identification processing 410.

The event monitoring information stream 403 is made of time 801, event information 802, object type 803, and object information 804. The contents of the event information 802 are severity 802a, registration time 802b, event ID 802c, source 802d, message 802e, and action 802f. The object type 803 is information for identifying an event issue source, such as service information, system information or job information.

The work information-mounted service event information stream 407a is made of time 801, work name 502a, service group name 502b, service information 505, and event information 802.

The work information-mounted system event information stream 407b is made of time 801, work name 502a, system name 502c, host information 702, and event information 802.

FIG. 9 illustrates the table structures of an event information table 307a inside the event information 307 storing the work information-mounted event information stream 407, as well as a differential event information table 307b and a similar event information table 307c storing the work information-mounted event monitoring information streams of a differential event and a similar event in the similar event search processing 412. Each of the event information tables 307a, 307b, and 307c has the same table structure, and is made of time 801, work name 502a, service group name 502*b*, service information 505, system name 502*c*, host information 702, and event information 802.

FIG. 10 illustrates a service performance information table 305*a* inside the performance information 306 which stores a service performance information stream 408*a* as a result of baseline determination of a statistic value found in the abnormality determination processing 411 for the work information-mounted service monitoring information stream 605. The work information-mounted service performance information stream 408*a* is made of time 1001, work name 502*a*, service group name 502*b*, service information 505, determination 1002, response time statistic value per minute 1003, throughput cumulative value per minute 1004, and error rate cumulative value per minute 1005. The contents of the service performance information table 305*a* are time 1001, work name 502*a*, service group name 502*b*, service information 505, determination 1002, response time statistic value per minute 1003, throughput cumulative value per minute 1004, and error rate cumulative value per minute 1005.

Figure 11:
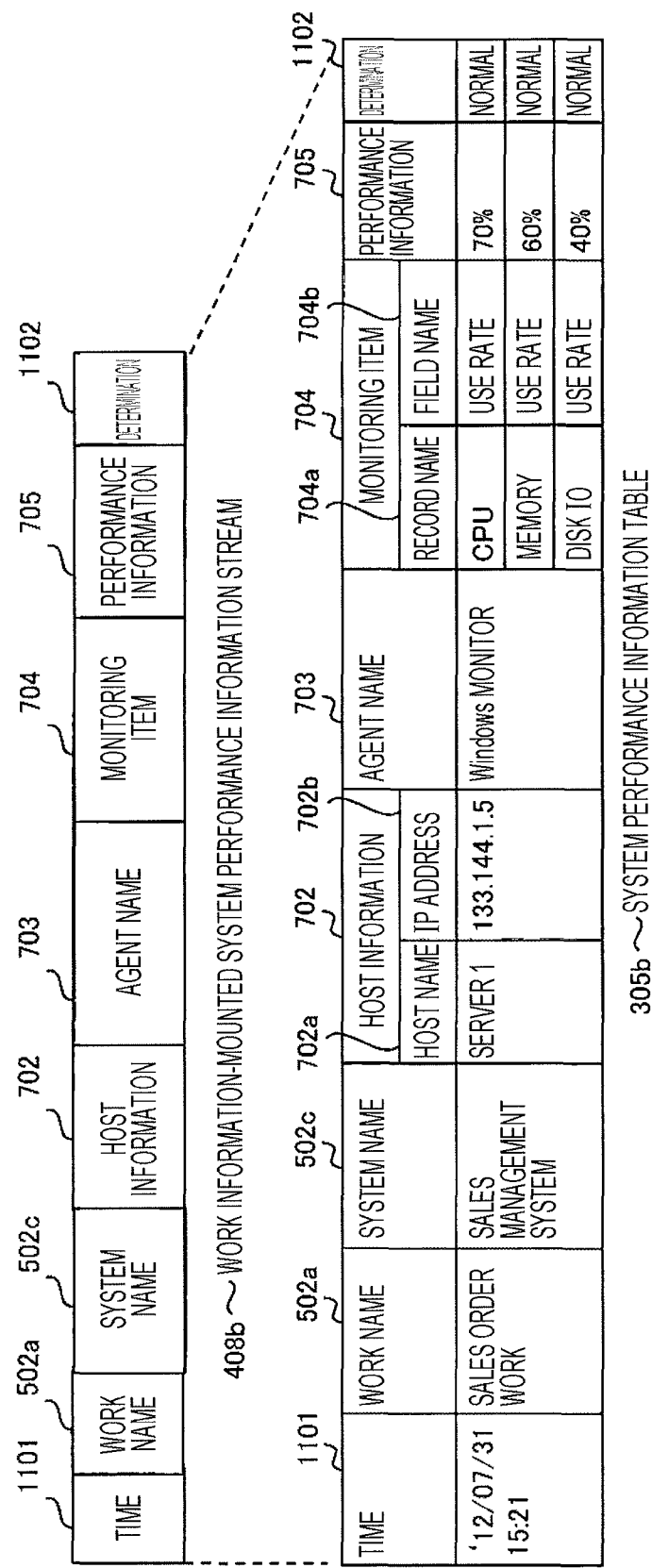
FIG. 11 is a diagram illustrating a system performance information table as a storage destination of a work information-mounted system performance information stream according to the first embodiment.

FIG. 11 illustrates a system performance information table 305*b* inside the performance information 306 for storing a system performance information stream 408*b* as a result of baseline determination in the abnormality determination processing 411 for the work information-mounted system monitoring information stream 706. The work information-mounted system performance information stream 408*b* is made of time 1101, work name 502*a*, system name 502*c*, host information 702, agent name 703, monitoring item 704, performance information 705, and determination 1102. The contents of the system performance information table 305*b* are time 1101, work name 502*a*, system name 502*c*, host information 702, agent name 703, monitoring item 704, performance information 705, and determination 1102.

FIG. 12 illustrates a service group performance abstract information table 306*a* of the baseline information 306 for storing a work information-mounted service group baseline information stream 409*a*, in which a statistic value of service performance per service group is found in a predetermined time (one hour, for example) and a date for which a throughput average value per minute is the closest thereto in the same service group and in the same time zone is detected to assume a next time zone of the detection date as a work-based baseline use time/date in the next time zone in the baseline setting processing 413 for the work information-mounted service performance information stream 408*a*. The work information-mounted service performance baseline information stream 409*a* is made of time 1201, work name 502*a*, service group name 502*b*, throughput (statistic value) 1202, error rate (statistic value) 1203, response time (statistic value) 1204, and baseline use time/date 1205. The contents of the service group performance abstract information table 306*a* are time 1201, work name 502*a*, service group name 502*b*, throughput statistic value (1202), error rate (statistic value) 1203, response time (statistic value) 1204, and baseline use time/date 1205.

Figure 13:
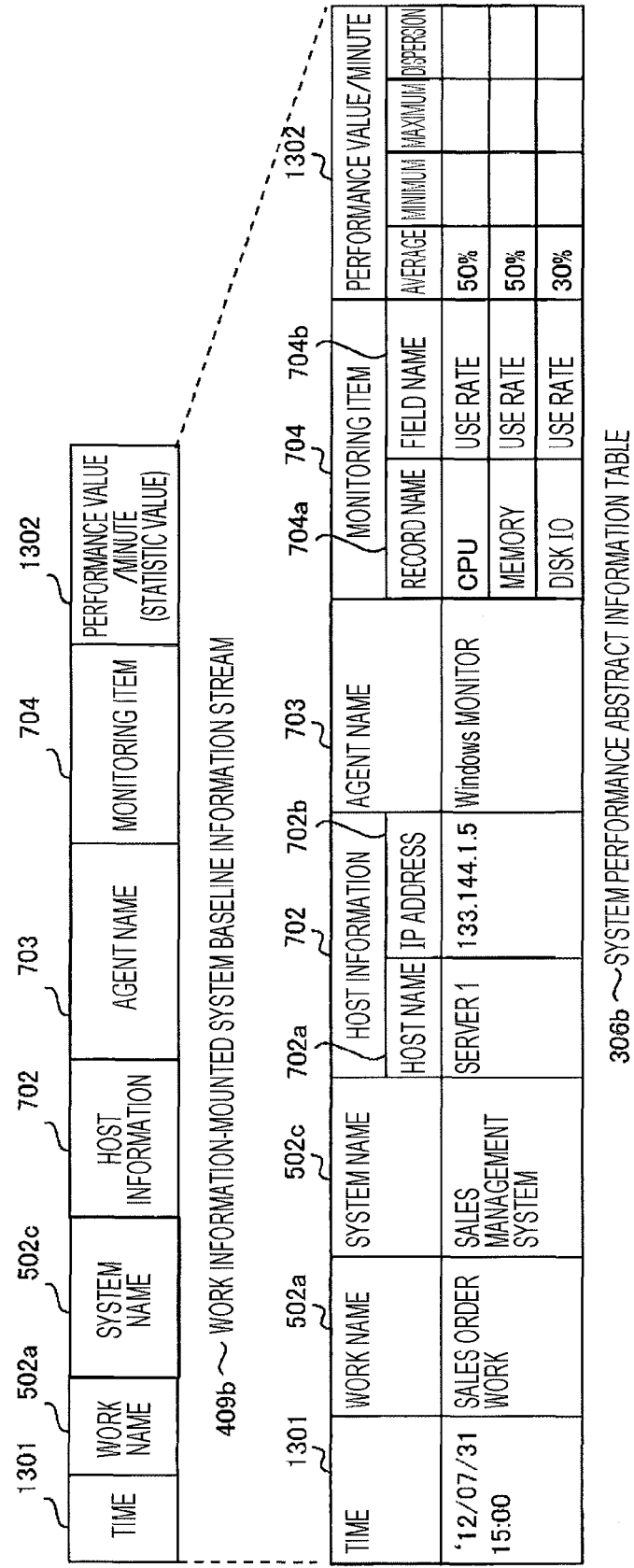
FIG. 13 is a diagram illustrating a system performance abstract information table as a storage destination of a work information-mounted system baseline information stream according to the first embodiment.

FIG. 13 illustrates a system performance abstract information table 306*b* of the baseline information 306 for storing a resultant work information-mounted system baseline information stream 409*b* which is obtained by finding a statistic value of a performance value for a monitoring item of an agent of a host inside a system per predetermined time (one hour, for example) in the baseline setting processing 413 for the work information-mounted system performance information stream 408*b*. The work information-mounted system baseline information stream 409*b* is made of time 1301, work name 502*a*, system name 502*c*, host information 702, agent name 703, monitoring item 704, and performance value (statistic value) 1302. The contents of the system performance abstract information table 306*b* are time 1301, work name 502*a*, system name 502*c*, host information 702, agent name 703, monitoring item 704, and performance value (statistic value) 1302.

The performance value (statistic value) in the system performance abstract information table 306*b* in FIG. 13 is used in consideration of the baseline use time/date 1205 for the time 1201 and the work name 502*a* in the service group performance abstract information table 306*a* in FIG. 12 which match with the work name 502*a* in the time zone to which the time 701 in the work information-mounted system monitoring information stream 706 in FIG. 7 belongs.

FIG. 14 illustrates a service catalog table 1401 and a system operating information table 1402 included in the system operating information 308. The contents of the service catalog table 1401 are system type 1403, server specification 1404, OS type 1405, middleware type 1406, and quantity 1407.

The contents of the system operating information table 1402 are system name 502*c*, system type 1403, UP (User Program) information 1408, cumulative operating days 1409, number of alerts 1410, number of failures 1411, average service performance information per predetermined time 1412, and average system performance information per predetermined time 1413.

A PaaS (Platform as a Service) provider registers a service to be provided in the service catalog table 1401.

The system name 502*c*, the system type 1403 selected from the service catalog table 1401, and the UP information 1408 are registered in the system operating information table 1402 on construction or modification of the system. The cumulative operating days 1409, the number of alerts 1410, and the number of failures 1411 are periodically registered and updated from separately-managed incident management. Further, the average service performance information per predetermined time 1412 and the average system performance information per predetermined time 1413 are periodically subjected to a count processing by the performance information 305 to be registered and updated.

The system operating information table 1402 is required to search a system having the same system type 1403 as the target system or to select a system having longer or closer operating performance from among the similar systems.

Figure 15:
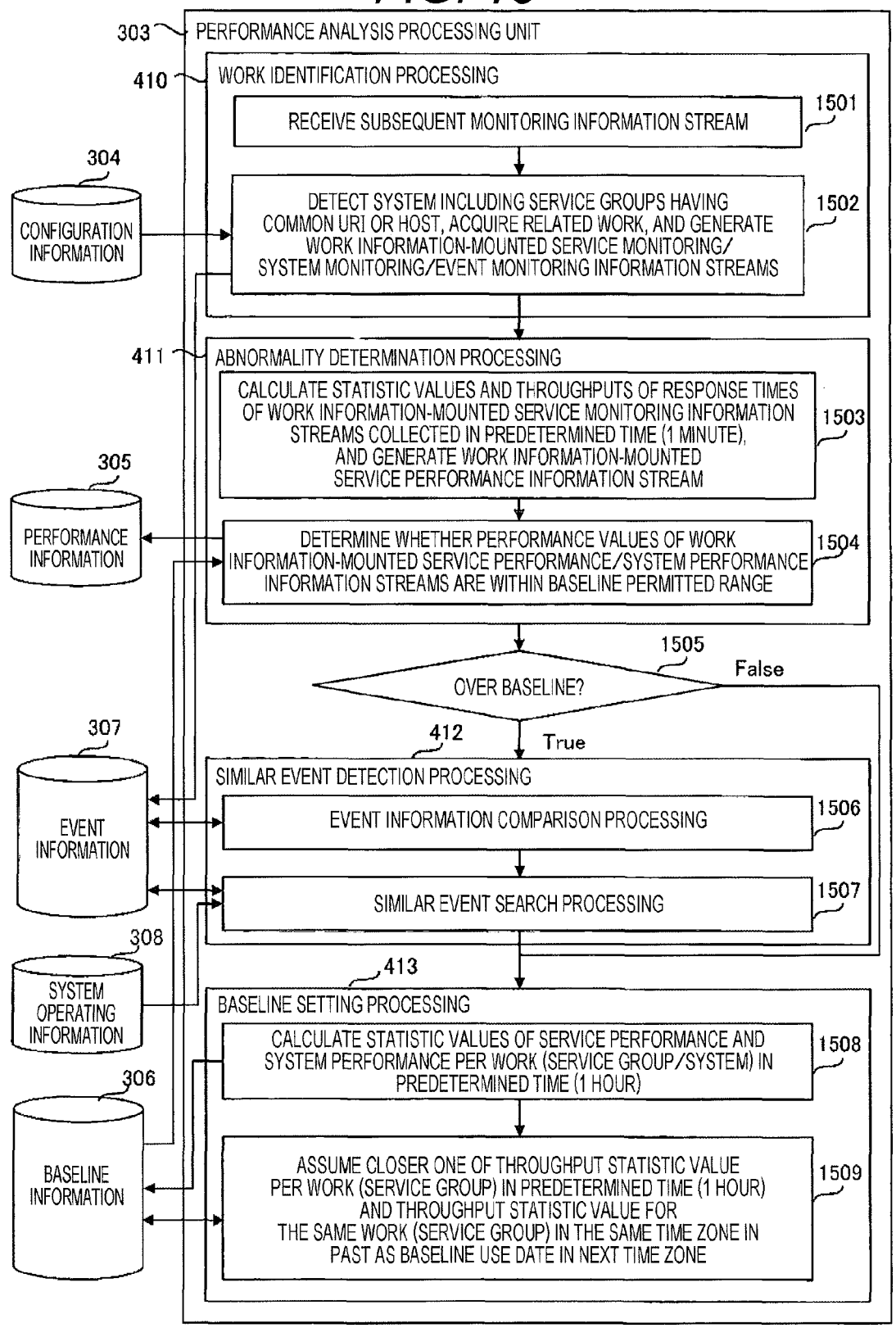
FIG. 15 is a flowchart of a performance analysis processing unit according to the first embodiment.

FIG. 15 illustrates a flow of processings in the performance analysis processing unit 303. The performance analysis processing unit 303 performs the processings in the order of the work identification processing 410, the abnormality determination processing 411, the similar event detection processing 412, and then the baseline setting processing 413.

The work identification processing 410 is made of a processing 1501 of receiving a monitoring information stream and a processing 1502 of adding work information to the monitoring information stream. The reception processing 1501 is to receive new information on the monitoring information stream.

The processing 1502 of adding work information to the monitoring information stream is such that the configuration information 304 is referred to, and in the case of the service monitoring information stream, works related to service groups having a common URI are acquired, and service information having common URI and query is acquired thereby to create a work type-mounted service monitoring information stream.

In the case of the system monitoring information stream, a work related to a system including hosts is acquired thereby to create a work information-mounted system monitoring information stream.

In the case of the event monitoring information stream, a work related to a service group is acquired from among the service information stored in the object information thereby to create work type-mounted event monitoring information when the object type is service. When the object type is host, a work related to a system including hosts is acquired thereby to create work type-mounted event monitoring information. The work type-mounted event monitoring information is stored in the event information 307.

The abnormality determination processing 411 is made of a processing 1503 of finding statistic values (average, maximum, minimum and dispersion) of the performance values and creating a work type-mounted service performance information stream for the work type-mounted service monitoring information stream incoming within a predetermined time, and a processing 1504 of determining whether the statistic value of the work type-mounted service performance information exceeds a baseline thereby to register the work type-mounted service performance information stream in the performance information 305, or determining whether the performance value exceeds a baseline for the monitoring item of the agent in the host of the work type-mounted system monitoring information thereby to register the work type-mounted system performance information stream in the performance information 305.

As a result of a determination unit 1505 as to whether the baseline permitted range is exceeded, when the baseline is exceeded, the similar event detection processing 412 is performed. The similar event detection processing 412 is made of an event information comparison processing 1506 of comparing event information between during normal time and during abnormal time and detecting a differential event, and a similar event search processing 1507 of searching whether a similar event to the differential event was present in past.

In the baseline setting processing 413, at first, a processing 1508 of creating performance abstract information within a predetermined time is to calculate a statistic value within a predetermined time (one hour, for example) of the service performance (such as response time or throughput) per unit time (one minute, for example) per service group for each work, thereby creating service performance abstract information. The processing 1508 is to calculate a statistic value within a predetermined time (one hour, for example) of the performance value of the monitoring item per agent of each host in the system, thereby creating system performance abstract information. The processing 1508 is to accumulate the statistic values (maximum value, minimum value and average value) of the performance information every unit time (one minute, for example).

Then, a processing 1509 of detecting a past statistic value close to the throughput statistic value within the predetermined time thereby to determine a baseline in a next time zone is to find a date of a closest throughput statistic value among the throughput statistic values in the same time zone in past for the service group of the same work when the performance abstract information for the predetermined time (one hour, for example) is accumulated, to assume it as a baseline use date in a next time zone and to store it in the baseline information 306.

Figure 16:
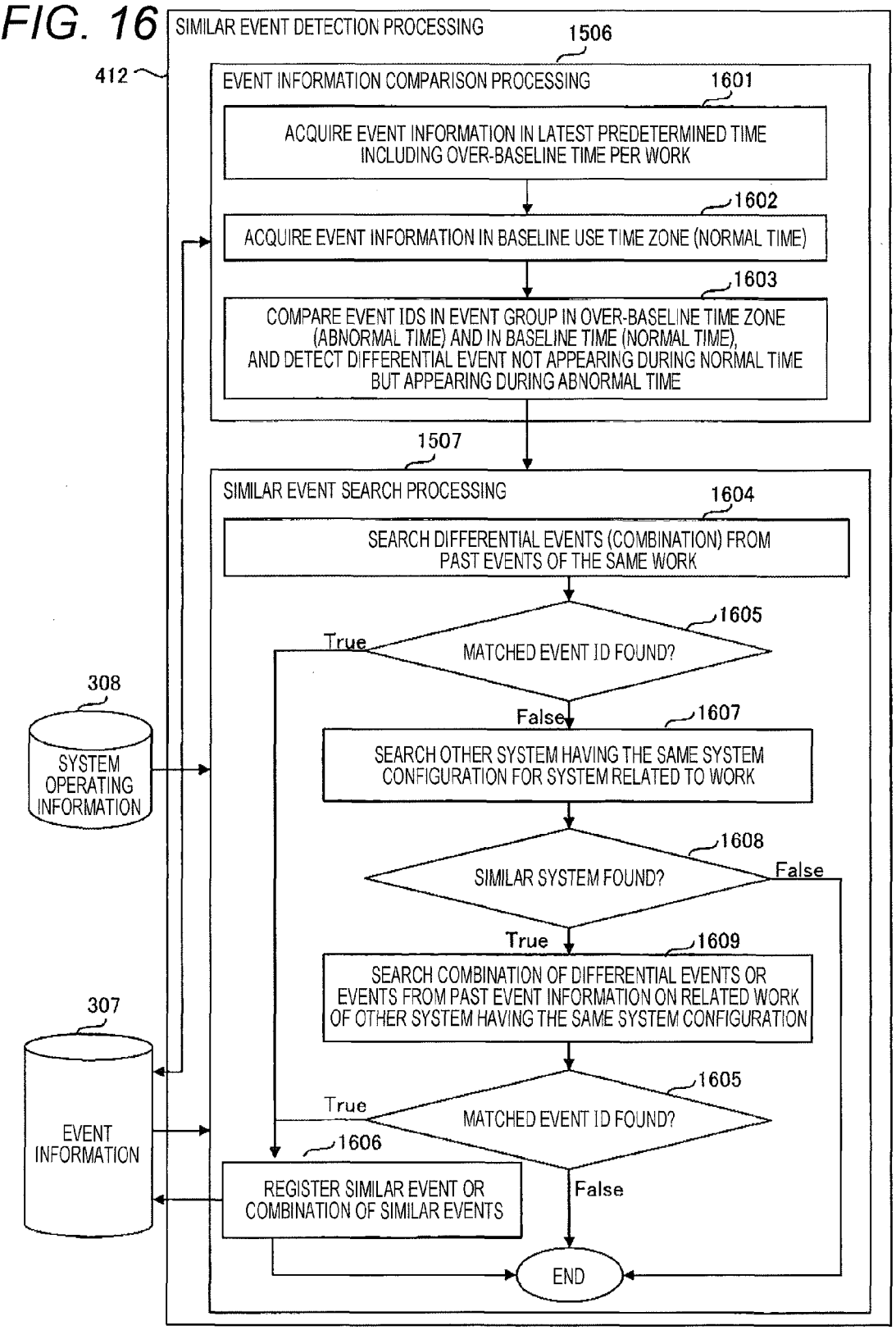
FIG. 16 is a flowchart of a similar event detection processing according to the first embodiment.

FIG. 16 illustrates a flow of processing in the similar event detection processing 412. The similar event detection processing 412 is made of the event information comparison processing 1506 and the similar event search processing 1507.

The event information comparison processing 1506 is made of a processing 1601 of acquiring event information within a most recent predetermined time including an over-baseline time per work, a processing 1602 of acquiring event information in the baseline use time zone (during normal time), and a processing 1603 of comparing event IDs of the event in the over-baseline time zone (during abnormal time) and the event in the baseline use time zone (during normal time), detecting a differential event not appearing during normal time but appearing during abnormal time, and storing the differential event in the event information 307.

The similar event search processing 1507 is made of a processing 1604 of searching an event whose event ID matches with a differential event (combination) from the past events of the same work, a matched differential event determination unit 1605, a processing 1606 of, when a matched event is found, storing the similar event (combination) in the event information 307, a processing 1607 of searching other system having the same system configuration as the system related to the work with reference to the system operating information 308, a system similarity determination unit 1608, and a processing 1609 of searching an event whose event ID matches with the differential event (combination) from the past events of the similar system-related work.

Figure 17:
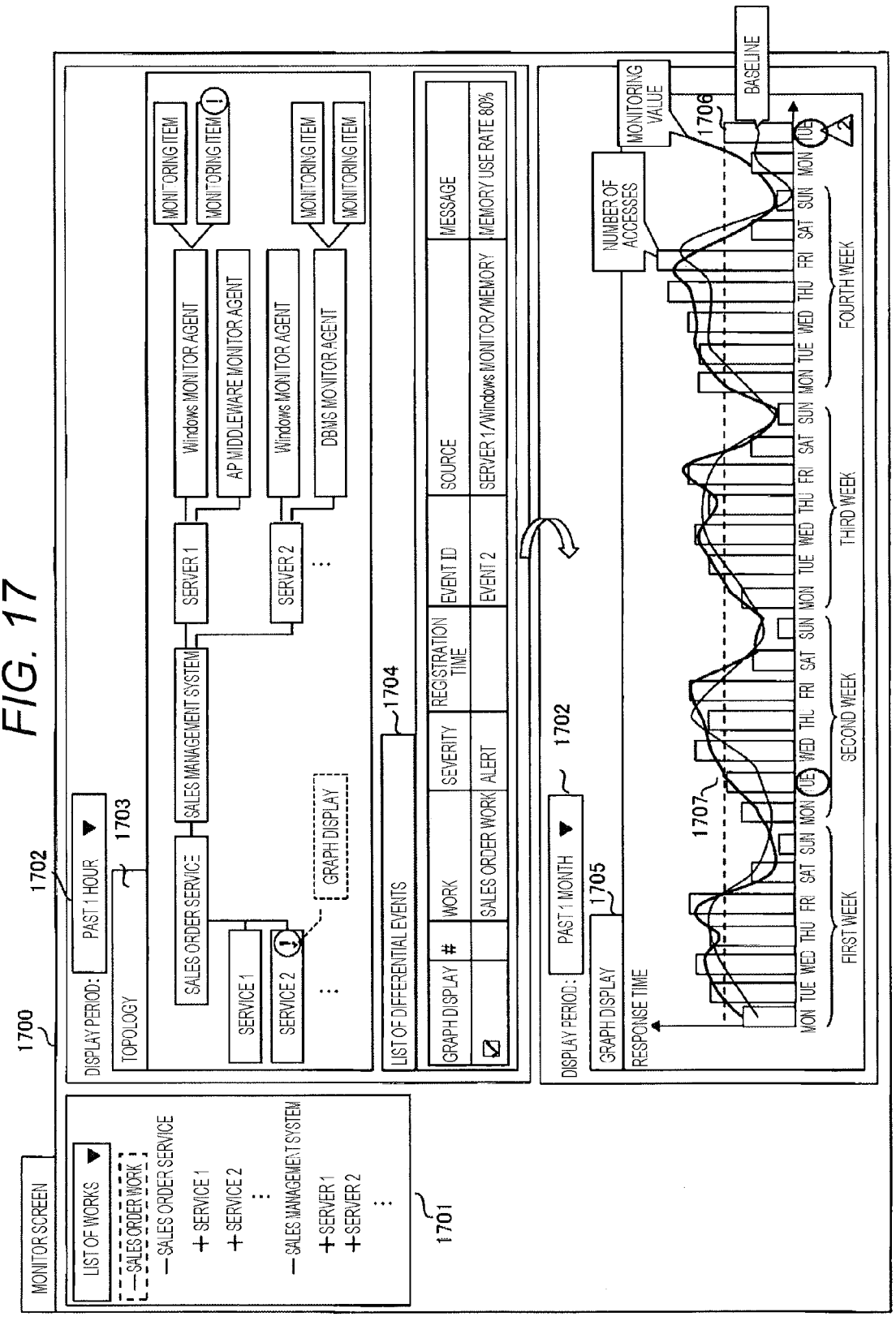
FIG. 17 is a diagram illustrating a monitor screen according to the first embodiment.
Figure 18:
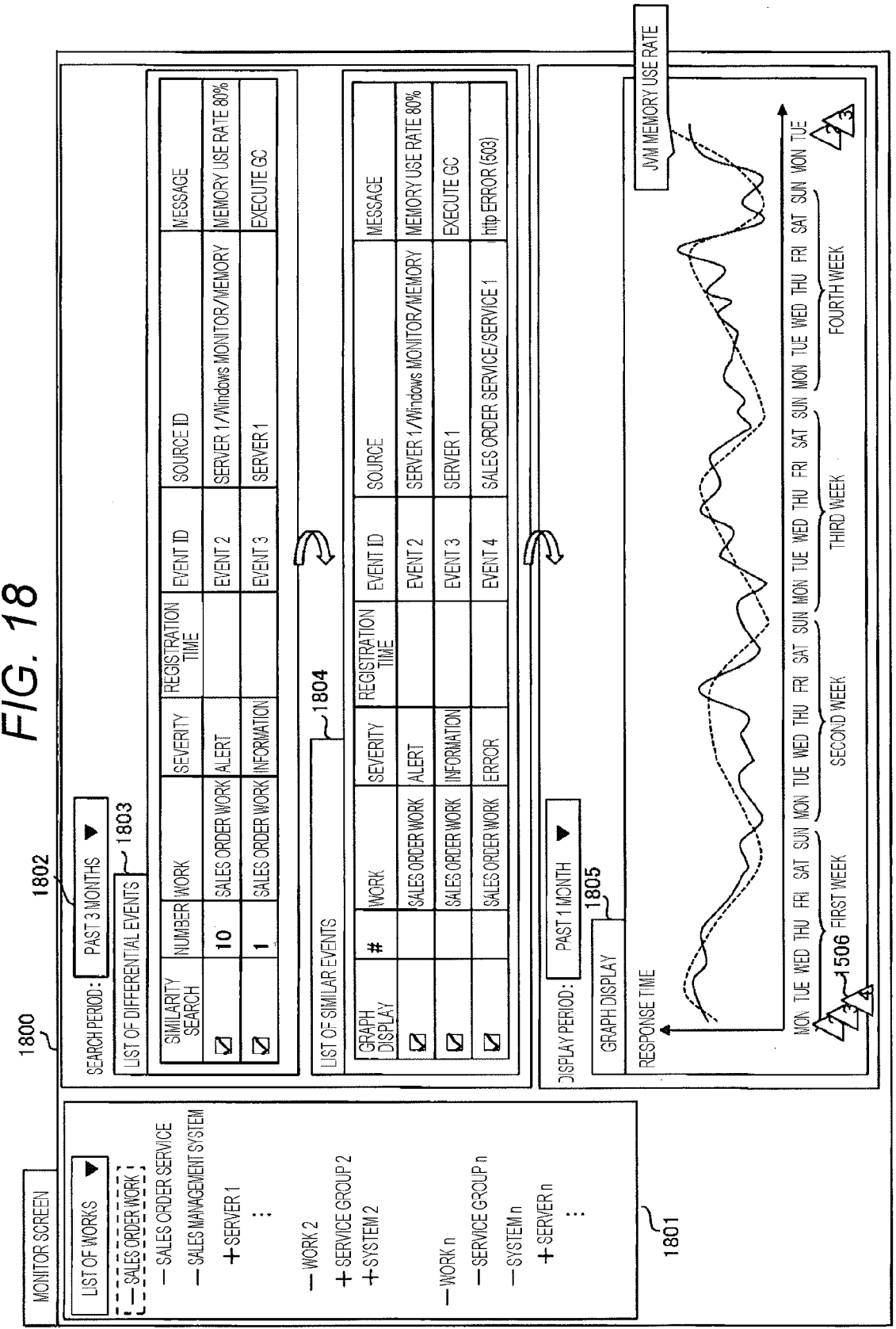
FIG. 18 is a diagram illustrating a monitor screen according to the first embodiment.

FIG. 17 and FIG. 18 illustrate the monitor screens executed by the screen display processing unit 301 in the service monitoring manager 114 installed in the service monitoring server 113 and displayed on the Web browser 118 in the terminal 117.

FIG. 17 illustrates a monitor screen 1700 when an exceeded baseline is detected and a differential event not appearing during normal time is detected as a result of baseline monitoring of the service and related system performance per work. The monitor screen 1700 is configured of a work list display unit 1701, a display period designation unit 1702, a topology display unit 1703, a differential event list display unit 1704, and a graph display unit 1705.

The way the monitor screen is used is that when an abnormality is sensed in an in-work service or host on the integrated event monitoring tool, a work to be confirmed is first selected by the work list display unit 1701 in the monitor screen 1700. Then, a period is designated by the display period designation unit 1702 and the operating situation of the service and host in the system configuring the work is confirmed by the topology display unit 1703. At this time, an event appearing only during abnormal time is displayed in the differential event list display unit 1704. Then, an abnormal portion's performance trend selected in the topology display unit 1703 and an event occurrence situation selected in the differential event list in the period designated in the display period designation unit 1702 are confirmed in the graph display unit 1705. The performance value on a date in the same time zone to which the number of most recent accesses is the closest is employed as a baseline in the graph display unit 1705, and thus the baseline of the response time of date 1706 when event 2 occurs is assumed as a baseline of the response time of date 1707 to which the number of accesses is the closest.

FIG. 18 illustrates a monitor screen 1800 as a result of detection of a similar event from among the past events of the same work and other works having the same system configuration for the differential event detected in FIG. 17. The monitor screen 1800 is configured of a work list display unit 1801, a display period designation unit 1802, a differential event list display unit 1803, a similar event list display unit 1804, and a graph display unit 1805.

The way the monitor screen is used is to designate a period in the display period designation unit 1802 and to confirm the number of differential event occurrences for the differential events during abnormal time detected in FIG. 17 in the differential event list display unit 1803. Herein, the differential events frequently occur, and a determination is made as to whether an event is ignorable or rarely occurs but is to be paid attention.

Subsequently, when an event rarely occurs but is to be paid attention, a similar event is searched from the past events on the same work or works in a similar system, and the search result is displayed in the similar event list 1804.

In the graph display unit 1805, the similar event occurrence situation and the performance trend are compared between current time and past time, an occurrence of failure is predicted, and possible information is presented before the failure occurs.

The above description is on the first embodiment.

Second Embodiment

A second embodiment will be described below with reference to the drawings.

Figure 19:
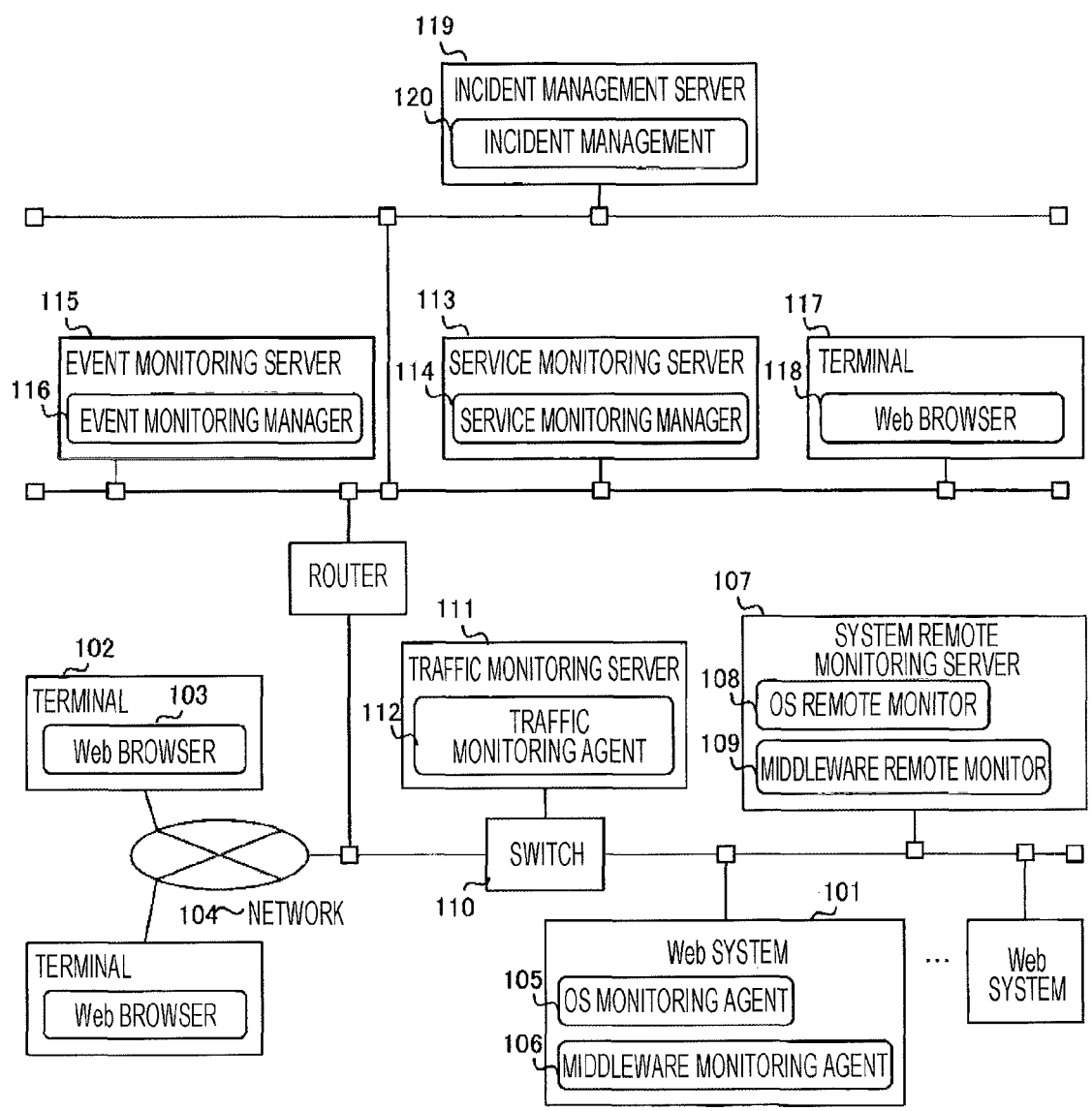
FIG. 19 is a diagram illustrating an information system according to a second embodiment.

FIG. 19 is a diagram illustrating a structure of the second embodiment, which is different from the first embodiment in that an incident management server 119 is added. An incident management 120 program is stored in a storage resource and is executed in the incident management server 119.

Figure 20:
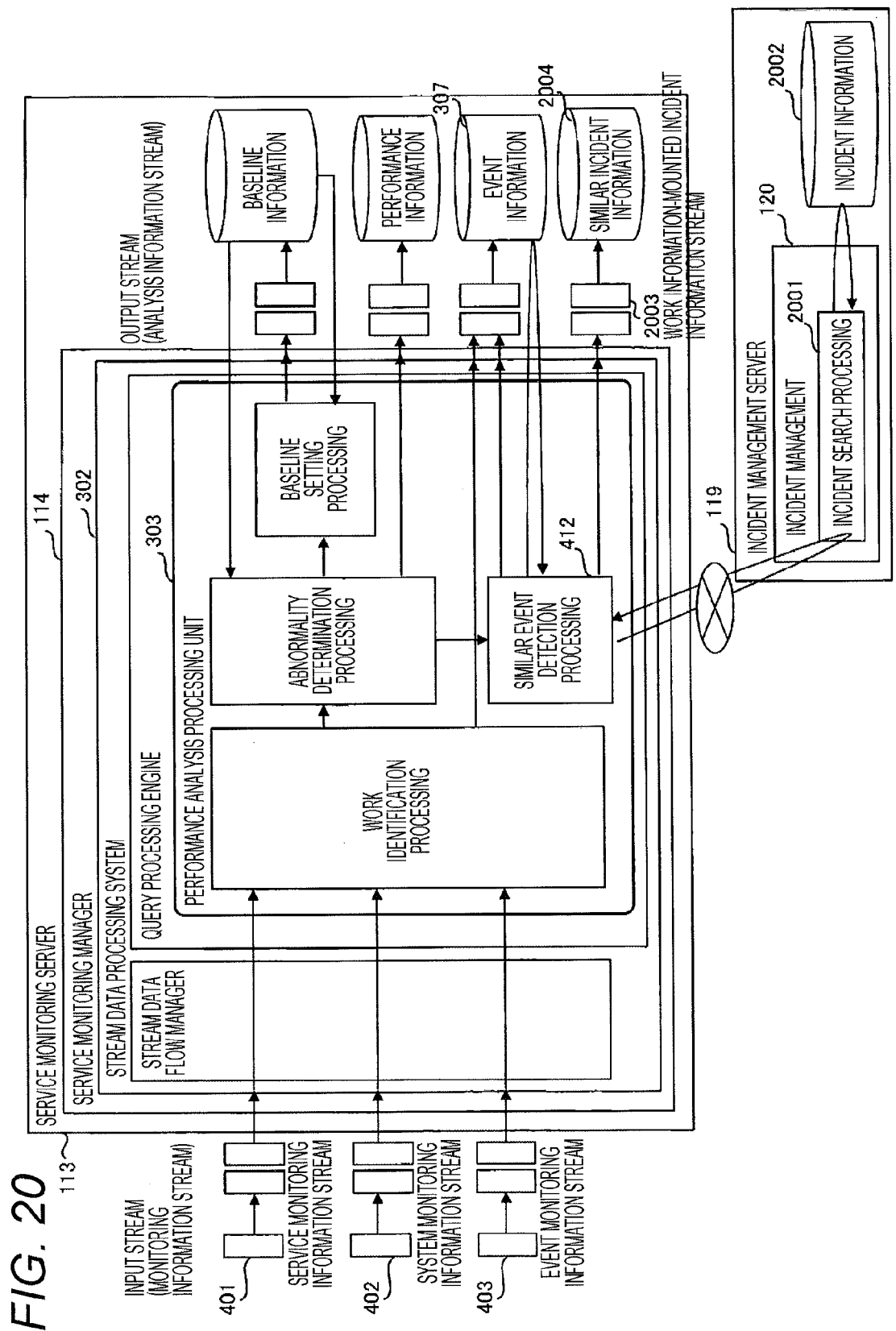
FIG. 20 is a diagram illustrating a performance analysis processing flow of the service monitoring manager using the stream data processing system according to the second embodiment.

FIG. 20 illustrates a structure and a processing flow when similar incident information is added to the structure and the processing flow of the service monitoring manager 114 in the service monitoring server 113 in FIG. 4 in association with the incident management 120 in the incident management server 119. In the performance analysis processing unit 303 in the stream data processing system 302, with the similar event detection processing 412, when a service performance or system operating performance exceeds a baseline permitted range, an event in an abnormal time zone and an event in a normal time zone used for the baseline are extracted from the event information 307 and are compared with each other for the work, and a differential event appearing only during abnormal time is detected. Then, with an incident search processing 2001 of the incident management 120 in the incident management server 119, a search is made as to whether similar incident information is present in incident information 2002 previously registered based on the past events for the work. As a result of the searching, when a similar incident is found, a work information-mounted incident information stream 2003 is generated to be stored in similar incident information 2004.

FIG. 21 illustrates input information 2101 and output information 2103 for the incident search processing 2001 of FIG. 20 as well as an incident information table 2101 inside the incident information 2002 and a similar incident information table 2104 inside the similar incident information 2004.

The input information 2101 for incident search is made of start time/date 2105 and end time/date 2106 indicating a search period, work name to be searched 502a, service group name 502b, system name 502c, and incident-related event ID 2107.

The incident information table 2102 is made of title 2108, severity 2109, incident ID 2110, URL to incident ID 2111, work name 502a, service group name 502b, system name 502c, occurrence time/date 2112, and incident-related event ID 2113.

The output information 2103 for incident search result corresponds to the items in the incident information table 2102.

The similar incident information table 2104 is made of items corresponding to the incident information for storing the incident search results in 2103.

Figure 22:
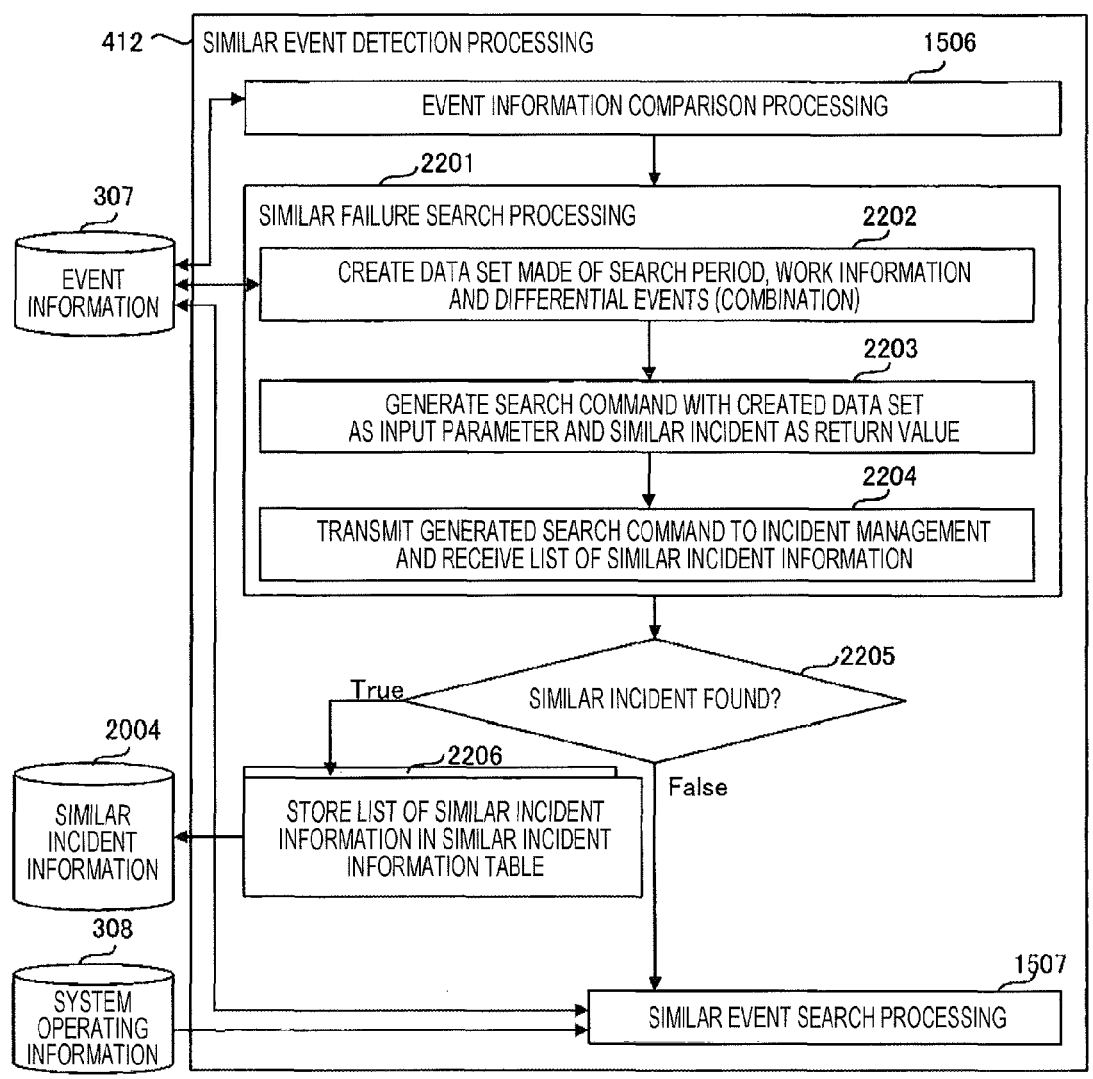
FIG. 22 is a flowchart of the similar event detection processing according to the second embodiment.

FIG. 22 illustrates a processing flow in which a similar failure search processing 2201 is added to the processing flow of the similar event detection processing 412 of FIG. 16. In the similar event detection processing 412, a differential event is detected by the event information comparison processing 1506 to be stored in the event information 307.

Then, in the similar failure search processing 2201, a search is made as to whether an incident based on a related event similar to the differential event (combination) is present. The similar failure search processing 2201 is made of a processing 2202 of creating a data set made of search period, work information, and differential event (combination), a processing 2203 of generating a search command with a similar incident as a return value by use of the created data set as an input parameter, and a processing 2204 of transmitting the generated search command to the incident management and receiving a list of similar incident information.

A determination processing 2205 is performed as to whether a similar incident is found as a result of the similar failure search processing 2201, and when a similar incident is found, a processing 2206 of storing the list of similar incident information in the similar incident information table is performed to store it in the similar incident information 2004. When a similar incident is not found, the similar event search processing 1507 is performed.

Figure 23:
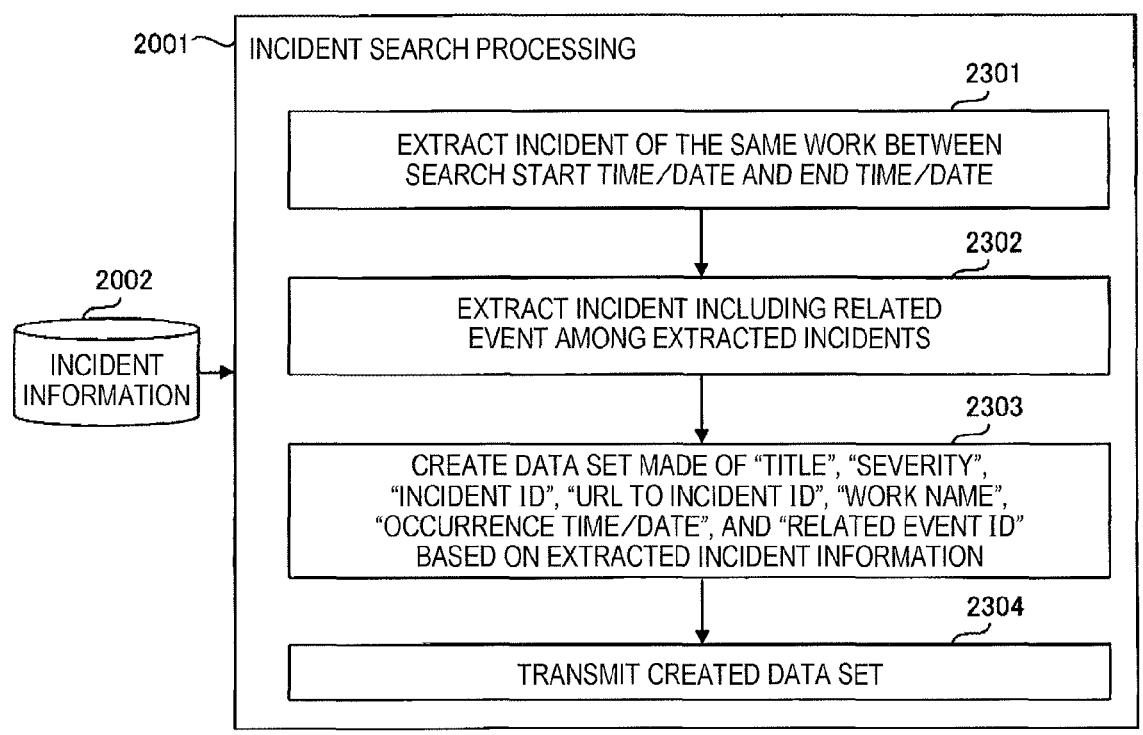
FIG. 23 is a flowchart of an incident search processing according to the second embodiment.

FIG. 23 illustrates a flow of processings of the incident search processing 2001 in the incident management 120 in the incident management server 119. The incident search processing 2001 is made of a processing 2301 of extracting an incident of the same work within a period between the search start time/date and end time/date, a processing 2302 of extracting an incident including a related event from among the extracted incidents, a processing 2303 of creating a data set made of "title", "severity", "incident ID", "URL to incident ID", "work name", "occurrence time/date", and "related event ID" from the extracted incident information, and a processing 2304 of transmitting the created data set.

Figure 24:
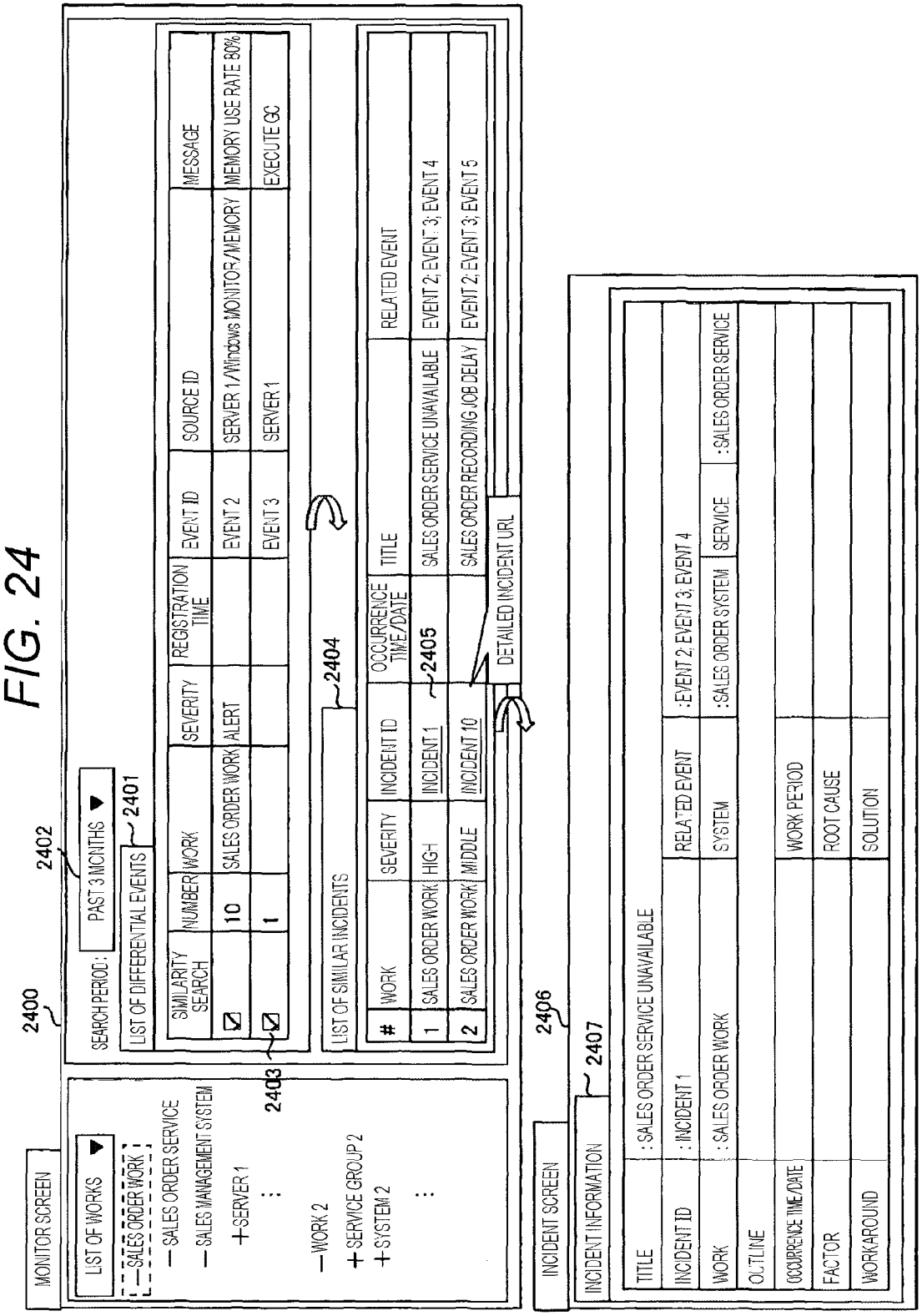
FIG. 24 is a diagram illustrating a monitor screen according to the second embodiment.

FIG. 24 illustrates a monitor screen executed by the screen display processing unit 301 in the service monitoring manager 114 installed in the service monitoring server 113 and displayed on the Web browser 118 in the terminal 117. FIG. 24 illustrates the monitor screen 2400 as a result of detection of a similar incident unlike the monitor screen 1800 as a result of detection of a similar event for a differential event in FIG. 18.

When search period 2402 is designated in differential event list 2401 in the monitor screen 2400, the number of event occurrences is displayed.

Then, a result obtained by searching an incident for events (combination) whose similarity to be searched is assigned with check 2403 is displayed in a similar incident list 2404.

Further, when incident ID 2405 is clicked, an incident screen 2406 at detailed incident URL is displayed. Incident information 2407 is displayed in the incident screen 2406, where a determination can be made as to whether a currently-occurring event may lead to a failure. Further, the incident screen 2406 displays thereon the contents such as workaround and solution made and input by a manager of the service execution infrastructure, and thus the manager of the service execution infrastructure can address a failure with reference to the displayed information before it occurs.

As described above, with the monitoring system according to the first and second embodiments, it is difficult to find a baseline as past performance information of a similar use situation in both indeterminately-changing service use and an in-system processing such as batch job for periodical standard processing, but a date close to a current throughput is found from among the throughputs of the past service in the same time zone, and thus the baselines for system and service added with the periodically-executed inside processing can be found with good accuracy in a short time.

With the monitoring system according to the first and second embodiments, when a baseline permitted range is exceeded, handling may be required since a failure can be caused and handling may not be required since a failure can be recovered over time, but information for correct determination can be presented in a prediction stage.

With the monitoring system according to the first and second embodiments, the system operating performance in the same time zone with a similar service use situation is assumed as a baseline, thereby sensing an in-system processing abnormality not due to an external access variation (disturbance). Thus, an external factor due to external access and an internal factor due to internal processing abnormality can be discriminated, and thus a time required for cause investigation can be reduced and a proper handling method can be employed.

As illustrated in FIG. 16, event information acquired in step 1602 is event information in a time zone of an employed baseline, and thus consequently-acquired event information, which is suitable for a service monitoring value, is selected. This is suitable when a different event occurs between on many service requests and on less service requests, for example. However, when the similar event detection processing of FIG. 16 applies a baseline even if not managing it in association with a service monitoring value, an event can be rapidly analyzed after an abnormality is detected in the service execution infrastructure. This is applicable also in FIG. 22.

Pseudo baselines may be combined (two baselines are averaged, for example) from among a plurality of baselines instead of selecting one baseline close to a service monitoring value for the baseline used for component abnormality detection. The combination is suitable when a component monitoring value does not rapidly change while service loads of the service execution infrastructure slightly increase. On the other hand, for selecting one baseline, when a baseline is displayed as illustrated in FIG. 17, the displayed baseline is actually generated, and thus the user of the monitoring system can make fact-based analyses more deeply. Corresponding event information can be more easily selected when one baseline is selected.

An event streamed from the event monitoring server 115 may be detected by the event monitoring server 115 when the event monitoring server 115 receives a message indicating the contents of the event from the Web system 101. Other event detecting methods may employ a method for transmitting a status acquisition request from the event monitoring server 115 to the service execution infrastructure and detecting an event based on the received status. However, the event detection may be accomplished by other methods.

REFERENCE SIGNS LIST

101 Web system
102 Terminal
111 Traffic monitoring server
113 Service monitoring server

The invention claimed is:

1. A monitoring system comprising:
    a communication interface configured to communicate with a service execution infrastructure including a plurality of components and directed for providing a predetermined service by use of the components;
    a storage resource; and
        a processor for receiving a service monitoring stream as a monitoring value of the predetermined service and component monitoring streams as monitoring values of the components from the service execution infrastructure,
        wherein the processor performs the processings of:
        (A) creating a component baseline based on a component monitoring stream in a predetermined time zone in past;
        (B) calculating a statistic value of a service measurement stream in a predetermined time zone in past;
        (C) storing the created component baseline in the storage resource in association with the predetermined time zone and the statistic value calculated in (B); and
        (D) when newly receiving a service monitoring stream and a component monitoring stream after creating the component baseline, selecting a component baseline suitable for the newly-received service monitoring stream, and determining an abnormality of the newly-received component monitoring stream based on the selected component baseline.

2. The monitoring system according to claim 1,
    wherein the monitoring system comprises a display device,
and
    the processor displays, on the display device,
    the newly-received service monitoring value;
    the newly-received component monitoring value; and
    the selected component baseline.

3. The monitoring system according to claim 2,
    wherein the processor
    (E) detects an event of the service execution infrastructure and stores it in the storage resource together with a detection time;
    (F) when (D) determines as abnormal, acquires the predetermined time zone associated with the component baseline in (D), and selects the event detected in the acquired time zone;
    (G) selects events up to a predetermined time ago from now which are not detected in the predetermined time zone based on the selected event; and
    (H) displays contents of the events selected in (G).

4. The monitoring system according to claim 3,
    wherein the processor
    (I) searches the events selected in (G) from past events thereby to display a similar event together with a detection time of the similar event.

5. The monitoring system according to claim 4,
    wherein the past events to be searched include events of other service execution infrastructure having a similar system configuration.

6. The monitoring system according to claim 3,
    wherein the processor
    (J) compares the events selected in (G) with an event included in incident information thereby to display contents of an incident which can relate to the events newly detected up to a predetermined time ago from now.

7. A non-transitory computer-readable medium storing instructions that, when executed by a processor, cause the processor to execute a monitoring program executed in a monitoring system for monitoring a service execution infrastructure including a plurality of components and directed for providing a predetermined service by use of the components,
wherein the monitoring program comprises the steps of:
receiving a service monitoring stream as a monitoring value of the predetermined service and component monitoring streams as monitoring values of the components from the service execution infrastructure;
(A) creating a component baseline based on a component monitoring stream in a predetermined time zone in past;
(B) calculating a statistic value of a service measurement stream in a predetermined time zone in past;
(C) storing the created component baseline in the storage resource in association with the predetermined time zone and the statistic value calculated in (B); and
(D) when newly receiving a service monitoring stream and a component monitoring stream after creating the component baseline, selecting a component baseline suitable for the newly-received service monitoring stream, and determining an abnormality of the newly-received component monitoring stream based on the selected component baseline.

8. The non-transitory computer-readable medium according to claim 7,
wherein the monitoring program causes a display device in the monitoring system to display:
the newly-received service monitoring value;
the newly-received component monitoring value; and
the selected component baseline.

9. The non-transitory computer-readable medium according to claim 8,
wherein the monitoring program further comprises the steps of:
(E) detecting an event of the service execution infrastructure and stores it in the storage resource together with a detection time;
(F) when (D) determines as abnormal, acquiring the predetermined time zone associated with the component baseline in (D), and selects the event detected in the acquired time zone;
(G) selecting events up to a predetermined time ago from now which are not detected in the predetermined time zone based on the selected event; and
(H) displaying contents of the events selected in (G).

10. The non-transitory computer-readable medium according to claim 9,
wherein the monitoring program further comprises a step of:
(I) searching the events selected in (G) from past events thereby to display a similar event together with a detection time of the similar event.

11. The non-transitory computer-readable medium according to claim 10,
wherein the past events to be searched comprise events of other service execution infrastructure having a similar system configuration.

12. The non-transitory computer-readable medium according to claim 9,
wherein the monitoring program further comprises a step of:
(J) comparing the events selected in (G) with an event included in incident information thereby to display contents of an incident which can relate to the events newly detected up to a predetermined time ago from now.

13. The monitoring system according to claim 3,
wherein the detecting an event is that:
the monitoring system receives information describing contents of an event therein from the service execution infrastructure; or
the monitoring system acquires a status of the service execution infrastructure thereby to determine that an event occurs in the service execution infrastructure.

14. The non-transitory computer-readable medium according to claim 9,
wherein the detecting an event is that:
the monitoring system receives information describing contents of an event therein from the service execution infrastructure; or
the monitoring system acquires a status of the service execution infrastructure thereby to determine that an event occurs in the service execution infrastructure.

15. A system comprising:
a service execution infrastructure including a plurality of components and directed for providing a predetermined service by use of the components, the plurality of components including at least one server having a processor and storage resources; and
a monitoring system for receiving a monitoring stream including a monitoring value of the service execution infrastructure,
wherein the monitoring system
(1) detects an event of the service execution infrastructure and stores it in a storage resource together with a detection time;
(2) creates a baseline based on past monitoring streams;
(3) stores the created baseline in the storage resource in association with a time zone of the basic past monitoring streams;
(4) when newly receiving a monitoring stream after creating the baseline, determines an abnormality of the newly-received monitoring stream based on the baseline;
(5) when determining as abnormal in (4), acquires a time zone associated with the baseline of (4), and selects an event detected in the acquired time zone;
(6) selects events up to a predetermined time ago from now which are not detected in the acquired time zone based on the selected event; and
(7) displays contents of the event selected in (G).

* * * * *